United States Patent
Borella et al.

(10) Patent No.: US 6,697,354 B1
(45) Date of Patent: Feb. 24, 2004

(54) METHOD AND SYSTEM FOR DISTRIBUTED NETWORK ADDRESS TRANSLATION FOR MOBILE NETWORK DEVICES

(75) Inventors: Michael S. Borella, Naperville, IL (US); David Grabelsky, Skokie, IL (US); Jerry Mahler, Prospect Heights, IL (US); Ikhlaq Sidhu, Vernon Hills, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/136,484

(22) Filed: Aug. 19, 1998

Related U.S. Application Data

(63) Continuation-in-part of application No. 09/035,600, filed on Mar. 5, 1998.

(51) Int. Cl.$^7$ .......................... H04L 12/66; H04L 12/28; H04J 3/16
(52) U.S. Cl. ...................... 370/352; 370/392; 370/401; 370/466; 455/432; 455/433; 709/238
(58) Field of Search .................... 370/400, 401, 370/402, 466, 467, 474, 331, 351, 352, 349, 389, 392, 393, 356; 455/432–436, 422; 709/245, 220, 238, 202, 317, 230

(56) References Cited

U.S. PATENT DOCUMENTS

| | | |
|---|---|---|
| 4,953,198 A | 8/1990 | Daly et al. ................ 379/61 |
| 5,159,592 A | 10/1992 | Perkins |
| 5,227,778 A | 7/1993 | Vacon et al. |
| 5,327,365 A | 7/1994 | Fujisaki et al. ............ 364/717 |
| 5,497,339 A | 3/1996 | Bernard ................... 364/705.5 |
| 5,526,353 A | 6/1996 | Henley et al. ............ 370/60.1 |
| 5,526,489 A | 6/1996 | Nilakantan et al. ..... 395/200.02 |
| 5,550,984 A | 8/1996 | Gelb |

(List continued on next page.)

FOREIGN PATENT DOCUMENTS

WO    WO 01/31888 A1    5/2001    ........... H04L/29/06

OTHER PUBLICATIONS

Kent, Stephen, Evaluating Certification Authority Security, Aerospace Conference, 1998 IEEE, Online, vol. 4, pp. 319–327 (Mar. 21–23, 1998).

Thayer, Rodney, Bulletproof IP With Authentication and Encryption IPSec Adds a Layer of Armor to IP, Data Communications, vol. 26, No. 16, pp. 55–58, 60 (Nov. 21, 1997).

Borella, M., Grabelsky, D., Lo, J., Tuniguchi, K., Internet Engineering Task Force, Internet Draft, "Realm Specific IP: Protocol Specification <draft–ietf–nat–rsip–protocol–.06.txt>", Mar. 2000, pp. 1–48.

(List continued on next page.)

Primary Examiner—Duc Ho
(74) Attorney, Agent, or Firm—McDonnell Boehnen Hulbert & Berghoff

(57) ABSTRACT

A method and system for distributed network address translation for mobile network devices. A mobile network device requests one or more locally-unique ports with a Port Allocation Protocol from a second network device on a first network to identify the first network device on the first network if the mobile first network device roams to a second external network. One or more default or ephemeral ports on the mobile network device are replaced with one or more locally-unique ports obtained with the Port Allocation Protocol. The one or more locally-unique ports allow distributed network address translation to be used with the mobile network device. A combination network address is created for the mobile network device with a locally unique port and an external network address for the first network to identify the mobile first network device if the mobile first network device roams to a second external network.

25 Claims, 15 Drawing Sheets

U.S. PATENT DOCUMENTS

| | | | |
|---|---|---|---|
| 5,604,737 A | 2/1997 | Iwami et al. | 370/352 |
| 5,606,594 A | 2/1997 | Register et al. | 379/58 |
| 5,636,216 A | 6/1997 | Fox et al. | |
| 5,654,957 A | 8/1997 | Koyama | 370/355 |
| 5,708,655 A | 1/1998 | Toth et al. | |
| 5,737,333 A | 4/1998 | Civanlar et al. | 370/352 |
| 5,742,596 A | 4/1998 | Baratz et al. | 370/356 |
| 5,754,547 A | 5/1998 | Nakazawa | 370/401 |
| 5,793,657 A | 8/1998 | Nemoto | 364/717.01 |
| 5,793,763 A | 8/1998 | Mayes et al. | |
| 5,812,819 A | 9/1998 | Rodwin et al. | |
| 5,835,723 A | 11/1998 | Andrews et al. | 395/200.56 |
| 5,862,331 A | 1/1999 | Herriot | 395/200.49 |
| 5,867,495 A | 2/1999 | Elliott et al. | 370/352 |
| 5,867,660 A | 2/1999 | Schmidt et al. | |
| 5,872,847 A | 2/1999 | Boyle et al. | |
| 5,889,774 A | 3/1999 | Mirashrafi et al. | 370/352 |
| 5,892,924 A | 4/1999 | Lyon et al. | 395/200.75 |
| 5,915,008 A | 6/1999 | Dulman | 379/201 |
| 5,933,778 A | 8/1999 | Buhrmann et al. | 455/461 |
| 5,950,195 A | 9/1999 | Stockwell et al. | 707/4 |
| 6,011,782 A | 1/2000 | DeSimone et al. | 370/260 |
| 6,055,236 A | 4/2000 | Nessett et al. | |
| 6,055,561 A | 4/2000 | Feldman et al. | 709/200 |
| 6,058,421 A | 5/2000 | Fijolek et al. | 709/225 |
| 6,058,431 A * | 5/2000 | Srisuresh et al. | 709/245 |
| 6,079,021 A | 6/2000 | Abadi et al. | 713/202 |
| 6,101,189 A * | 8/2000 | Tsuruoka | 370/401 |
| 6,101,543 A | 8/2000 | Alden et al. | 709/229 |
| 6,104,711 A | 8/2000 | Voit | 370/352 |
| 6,115,751 A | 9/2000 | Tam et al. | 709/240 |
| 6,134,591 A | 10/2000 | Nickles | 709/229 |
| 6,137,791 A * | 10/2000 | Frid et al. | 370/352 |
| 6,157,950 A | 12/2000 | Krishnan | 709/223 |
| 6,172,986 B1 | 1/2001 | Watanuki et al. | 370/466 |
| 6,185,184 B1 | 2/2001 | Mattaway et al. | 370/230 |
| 6,195,705 B1 * | 2/2001 | Leung | 709/245 |
| 6,212,183 B1 | 4/2001 | Wilford | 370/392 |
| 6,212,563 B1 | 4/2001 | Beser | 709/227 |
| 6,249,820 B1 | 6/2001 | Dobbins et al. | 709/238 |
| 6,266,707 B1 * | 7/2001 | Boden et al. | 709/245 |
| 6,269,099 B1 | 7/2001 | Borella et al. | 370/389 |
| 6,353,614 B1 | 3/2002 | Borella et al. | 370/389 |
| 6,353,891 B1 | 3/2002 | Borella et al. | 713/201 |

OTHER PUBLICATIONS

Borella, M., Grabelsky, D., Lo, J., Tuniguchi, K., Internet Engineering Task Force, Internet Draft, "Realm Specific IP: Protocol Specification <draft–ietf–nat–rsip–protocol–.07.txt>", Jul. 2000, pp. 1–49.

Montenegro, G., Internet Engineering Task Force, Internet Draft, "RSIP Support for End–to–End IPsec," <draft–ietf–nat–rsip–ipsec–04.txt>, Jul. 2000, pp. 1–17.

Borella, M., Lo, J., Grabelsky, D., Montenegro, G., Internet Engineering Task Force, Internet Draft, "Realm Specific IP: Framework <draft–ietf–nat–rsip–framework.05.txt>", Jul. 2000, pp. 1–30.

Borella, M., Montenegro, G., RSIP: Address Sharing with End–To–End Security, USENIX Conference, San Francisco, California, Mar. 9, 2000, pp. 1–9.

Gilligan, R. et al., Basic Socket Interface Extensions for IPv6, Request for Comments 2553, Mar. 1999, pp. 1–41.

Srisuresh, P.,et al., IP Network Address Translator (NAT) Terminology and Considerations, Request for Comments 2663, Aug. 1999, pp. 1–30.

Durand, Alain, Deploying Ipv6, IEEE Internet Computing, http://computer.org/internet, Jan.–Feb. 2001, pp. 79–81.

Borella, M., Lo, J., Grabelsky, D., Montenegro, G., IETF Proceedings presentation, Realm Specific IP: Protocol Specification <draft–nat–rsip–protocol–00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1–3.

Borella, M., Lo, J., Grabelsky, D., Montenegro, G., Internet Engineering Task Force, Internet Draft, "Realm Specific IP: Framework <draft–ietf–nat–rsip–framework–.04.txt>", Mar. 2000, pp. 1–30.

IETF Mar. 1999 Proceedings, 2.7.10 Network Address Translators (nat), pp. 1–13.

Rosenberg, Jonathan D. and Shockley, Richard, The Session Initiation Protocol (SIP): A Key Component for Internet Telephony, ComputerTelephony.com, Jun. 2000, pp. 124–139.

Fenner, W., Internet Group Management Protocol Version 2, RFC 2236, Nov. 1997, pp. 1–24.

Mogul, J. et al., "Internet Standard Subnetting Procedure", RFC 950, Aug. 1985, pp. 1–18.

Schulzrinne et al., "RTP: A Transport Protocol for Real–Time Applications", RFC 1889, pp. 1–75.

Privat, Jermone, "Double Phase DHCP Configuration", <draft–privat–dhc–doublephase–01.txt>, Internet Engineering Task Force, Sep. 1999, pp. 1–4.

Maughan, D. et al., "Internet Security Association and Key Management Protocol", RFC 2408, Nov. 1998, pp. 1–86.

Karn, P., "Photuris Session—Key Management Protocol", RFC 2522, Mar. 1999, pp. 1–58.

Borella, Michael et al., "Realm Specific IP: Protocol Specification", <draft–ietf–nat–rsip–protocol.02.txt>, Internet Draft, Aug. 1999, pp. 1–27.

Gilligan, R. et al., "Transmission Mechanisms for IPv6 Hosts and Routers", RFC 1933, Apr. 1996, pp. 1–22.

Afifi, H. et al., "Method for IPv4–IPv6 Transition", Proceedings IEEE International Symposium on Computers and Communications, Jul. 6–8, 1999, pp. 478–484.

P. Srisuresh, Internet Engineering Task Force, Internet Draft "Security for IP Network Address Translator (NAT) Domains," <draft–ietf–nat–security–00.txt>, Nov. 1998, pp. 1–11.

R. G. Moskowitz, Internet Engineering Task Force, Internet Draft "Network Address Translation Issues with IPsec," <draft–moskowitz–net66–vpn–00.txt>, Feb. 6, 1998, pp. 1–8.

R. Thay, N. Doraswa and R. Gle, Internet Engineering Task Force, Internet Draft "IP Security," <draft–ietf–ipsec–doc–roadmap–.02.txt.>, Nov. 1997, pp. 1–12.

Borella, Michael, Technology Update—Protocol Helps Stretch IPv4 Addresses, "Network World", vol. 17, No. 3, Jan. 17, 2000, p. 43.

K. Egevang and P. Francis, "The IP Network Address Translator (NAT)", RFC 1631, Internet Engineering Task Force, www.ietf.org/rfc/rfc1631.txt, May 1994, pp. 1–10.

W.T. Teo, S.W. Yeeow, R. Singh, Internet Engineering Task Force, Internet Draft, "IP Relocation Through Twice Network Address Translator," <draft–ietf–nat–mat–00.txt>, Feb. 1999, pp. 1–20.

George Tsirtis, Pyda Srishuresh, Internet Engineering Task Force, Internet Draft, "Network Address Translation—Protocol Translation (NAT–PT), <draft–ietf–ngtrans–natpt–04.txt>," Jan. 1999, pp. 1–13.

P. Srisur, K. Egev, Internet Engineering Task Force, Internet Draft, "Traditional IP Network Address Translator (Traditional NAT)," <draft–ietf–nat–traditional–01.txt>, Oct. 1998, pp. 1–17.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1–21.

G. Montene, Internet Engineering Task Force, Internet Draft, "Negotiated Address Reuse" (NAR), <draft–montenegro–aatn–nar–00.txt>, May 1998, pp. 1–22.

P. Srisur, Matt Holdrege, Internet Engineering Task Force, Internet Draft, "IP Network Address Translator (NAT) Terminology and Consideration," <draft–ietf–nat–terminology–01.txt>, Oct. 1998, pp. 1–28.

W.T. Teo, Y. Li, Internet Engineering Task Force, Internet Draft, "Mobile IP Extension for Private Internets Support," <draft–teoyli–mobileip–mvpn–02.txt>, Feb. 1999, pp. 1–24.

P. Sris, K. Eg, Internet Engineering Task Force, Internet Draft, "The IP Network Address Translator" (NAT), <draft–rfced–info–srisuresh–05.txt>, Feb. 1998, pp. 1–24.

W.T. Teo, S.W. Yeow, R. Singh, Internet Engineering Task Force, Internet Draft, "Reverse Twice Network Address Translators (RAT)," <draft–teoyeow–mip–rat–01.txt>, Dec. 1998, pp. 1–20.

Jeffrey Lo, K, Taniguchi, Internet Engineering Task Force, Internet Draft, "IP Host Network Address (and port) Translation," <draft–ietf–nat–hnat–00.txt>, Nov. 1998, pp. 1–13.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1–32.

T. Hain, Internet Engineering Task Force, Internet Draft, "Architectural implications of NAT," <draft–iab–nat–implications–02.txt>, Oct. 1998, pp. 1 to 14.

Yakov Rekhter, Internet Engineering Task Force, Internet Draft, "Implications of NATs on the TCP/IP Architecture," <draft–ietf–nat–arch–implications–00.txt>, Feb. 1999, pp. 1–7.

P. Srisuresh, G. Tsiris, P. Akkiraju, A. Heffernan, Internet Engineering Task Force, Internet Draft, "DNS Extensions to Network Address Translators" (DNS_ALG), <draft–ietf–nat–dns–01.txt>, Oct. 1998, pp. 1–24.

George Tsirtis, Alan O'Neill, Internet Engineering Task Force, Internet Draft, "NAT Bypass for End 2 End 'Sensitive' Applications," <draft–tsirtsis–nat–bypass–00.txt–22 , Jan. 1998, pp. 1–5.

* cited by examiner

FIG. 3

PORT ALLOCATION PROTOCOL (PAP) 64

| PAP REQUEST MESSAGE | 66 |
| PAP RESPONSE MESSAGE | 68 |
| PAP INVALIDATE MESSAGE | 70 |
| COMBINATION NETWORK ADDRESS (COMMON EXTERNAL NETWORK ADDRESS/GLOBALLY OR LOCALLY UNIQUE PORT) | 72 |

PAP REQUEST MESSAGE LAYOUT

PAP RESPONSE MESSAGE LAYOUT

PAP INVALIDATE MESSAGE LAYOUT

PORT-TO-INTERNAL-NETWORK
ADDRESS TABLE

FIG. 11
SOURCE PORT TRANSLATION TABLE (SPTT)

| LOCAL PORT | GLOBAL PORT |
|---|---|
| PROTOCOL | TIMESTAMP |

FIG. 12
IP ADDRESS TRANSLATION TABLE (IPATT)

| DESTINATION PORT | INTERNAL DESTINATION IP ADDRESS |
|---|---|
| PROTOCOL | TIMESTAMP |

METHOD AND SYSTEM FOR DISTRIBUTED NETWORK ADDRESS TRANSLATION FOR MOBILE NETWORK DEVICES

CROSS REFERENCES TO RELATED APPLICATIONS

This application is a Continuation-In-Part of U.S. application Ser. No. 09/035,600 filed on Mar. 5, 1998.

FIELD OF INVENTION

This invention relates to computer networks. More specifically, it relates to a method and system for distributed network address translation for mobile network devices on computer networks.

BACKGROUND OF THE INVENTION

The Internet Protocol ("IP") is an addressing protocol designed to route traffic within a network or between networks. The Internet Protocol is used on many computer networks including the Internet, intranets and other networks. Internet Protocol addresses are typically assigned to "immobile" nodes on a network. An immobile node may be moved to a different computer network, but is typically associated with a static physical location (e.g., 3Com Corporation in Santa Clara, Calif.).

The Mobile Internet Protocol allows "mobile" nodes to transparently move between different Internet Protocol sub-networks ("subnets"). Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device. When a mobile node "roams," (i.e., dynamically changes its physical location), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates the mobile node is away from "home" (i.e., away from its home subnet). The registration with the foreign agent allows the mobile node to receive data on the foreign subnet.

The Mobile Internet Protocol allows a mobile node to dynamically change its network connectivity in a manner that is transparent to protocol layers above the Internet Protocol layer. For example, without re-establishing Transmission Control Protocol or User Datagram Protocol sessions. As is known in the art, the Internet Protocol suite includes from lowest-to-highest, a link, network, transport and application layer. The Internet Protocol typically resides in the network layer in the Internet Protocol suite. Transmission Control Protocol and User Datagram Protocol typically reside in the transport layer of the Internet Protocol suite.

As is known in the art, Transmission Control Protocol ("TCP") and User Datagram Protocol ("UDP") are often used over IP in computer networks. Transmission Control Protocol provides a connection-oriented, end-to-end reliable protocol designed to fit into a layered hierarchy of protocols that support multi-network applications. User Datagram Protocol provides a transaction oriented datagram protocol, where delivery and duplicate packet protection are not guaranteed.

Current versions of Internet Protocol such as Internet Protocol version-4 ("IPv4"), including those used for Mobile Internet Protocol are becoming obsolete because of limited address space. With a 32-bit address-field, it is possible to assign $2^{32}$ different addresses, which is 4,294,967,296, or greater than 4 billion possible addresses. However, with the explosive growth of the Internet and intranets, and the increased use of Mobile Internet Protocol, Internet Protocol addresses using a 32-bit address-field may soon be exhausted. Internet Protocol version-6 ("IPv6") proposes the use of a 128-bit address-field for IP addresses. However, a large number of legacy networks including a large number of Internet subnets will still be using older versions for Internet Protocol with a 32-bit address space for many years to come.

Network Address Translation ("NAT") has been proposed to extend the lifetime of Internet Protocol version 4 and earlier versions of Internet Protocol by allowing subnets to exist behind a single or small number of Internet Protocol addresses. A single Internet Protocol address is used for communication with external networks such as the Internet. Internally, the subnet uses local addressing. When a device or node using local addressing desires to communicate with the external world, a local address is translated to a common external Internet Protocol address used for communication with an external network by a network address translation device.

There are several problems associated with using network address translation to extend the life of the Internet Protocol including Mobile Internet Protocol. Network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927).

Current versions of network address translation replace a local network address in a data packet header with an external network address on outbound traffic, and replace an external network address in a data packet header with a local network address on inbound traffic. This type of address translation is computationally expensive, causes security problems by preventing certain types of encryption from being used, or break a number of existing applications in a network that cannot provide network address translation (e.g., File Transfer Protocol ("FTP")).

Current versions of network address translation may not gracefully scale beyond a small subnet containing a few dozen nodes or devices because of the computational and other resources required. Network address translation potentially requires support for many different internal network protocols be specifically programmed into a translation mechanism for external protocols in a network address translation device such as a network address translation router. Computational burdens placed on a network address translation router may be significant and degrade network performance, especially if several network address translation-enabled stub networks share the same network address translation router. In a worst case scenario, a network address translation router translates every inbound and outbound data packet.

When network address translation is used to translate a Transmission Control Protocol/Internet Protocol or User Datagram Protocol/Internet Protocol data packet, the packet's Internet Protocol, Transmission Control Protocol or User Datagram Protocol checksums are recalculated. When a port in a Transmission Control Protocol or User Datagram Protocol header is translated, the packet's Transmission Control Protocol or User Datagram Protocol checksums are also recalculated. This further increases the computational cost of translation in a network address translation router.

When an Internet Protocol address or port is translated with network address translation, a new length may result for the data packet and a possible change in a Transmission Control Protocol sequence number. A running sequence number offset (i.e., a delta) must then be maintained throughout the remainder of the connection. This delta must be applied to a future traffic, including acknowledgment numbers further increasing computational time in a network address translation router.

In addition to Transmission Control Protocol or User Datagram Protocol, a network address translation router should be able to translate addresses, ports, change lengths and maintain sequence numbers for a number of different protocols that may transmit an Internet Protocol address or port number (e.g., FTP, H.323, H.324, CUSeeME, RealAudio, Internet Relay Chat and others). On a networks using Internet Protocol, it is desirable to provide network address translation without large computational burdens in a network address translation router.

Use of Mobile Internet Protocol may further aggravates network address translation problems. A number of address translations may be completed for a mobile node using Mobile Internet Protocol. For example, a home agent on a home subnet with a local network address receives data packets addressed to a mobile node. The local network address for the mobile node may not be globally routable (i.e., not available to external networks). The mobile node roams to a foreign subnet and is assigned a temporary foreign network address on the foreign network that is also not globally routable. The home agent sends the data packets for the mobile node via a first external network address, that identifies the home subnet to external networks. A foreign agent at a second external network address that identifies the foreign subnet to external networks, receives data from the home agent. The foreign agent also has a local network address on the foreign network.

The foreign agent sends the data packets to the mobile node at the temporary foreign network address assigned to the mobile node on the foreign network via the first and second internal network addresses on the foreign network.

Since the home agent and foreign agent may use multiple network addresses and may function as network address translation routers, they may also suffer from the network address translation problems discussed above. Thus, it is desirable to provide an improved network address translation method for network devices that use the Mobile Internet Protocol.

SUMMARY OF THE INVENTION

In accordance with preferred embodiments of the present invention, some of the problems associated with network address translation are overcome. A method and system for distributed network address translation is provided. In one preferred embodiment of the present invention, one aspect of the method for distributed network address translation includes requesting from a mobile first network device on a first network with a first protocol, one or more locally-unique ports. The one or more locally-unique ports are requested from a second network device on the first network to identify the mobile first network device on the first network if the mobile first network device roams to a second external network. The one or more locally-unique ports allow the mobile first network device to use distributed network address translation. In one preferred embodiment of the present invention, the first protocol is a Port Allocation Protocol that allows distributed network address translation to be used. One or more default or ephemeral ports on the mobile first network device are replaced with one or more locally-unique ports obtained with the first protocol. A default port is typically statically assigned. An ephemeral port is typically dynamically assigned for a duration of time. A combination network address is created for the mobile first network device with a locally unique port and an external network address for the first network to identify the mobile first network device if the mobile first network device roams to a second external network.

Another aspect of the method for distributed network address translation includes roaming a mobile first network device from a first network to a second external network. The mobile first network device is identified by a combination network address obtained with a first protocol, the combination network address including a locally-unique port and an external network address for the first network. The mobile first network device registers with a third network device on the second external network. The mobile first network device receives a temporary foreign network address from the third network device to identify the mobile first network device on the second external network. The mobile first network device sends the temporary foreign network address and the combination network address to a second network device on the first network to indicate that the mobile first network device has roamed to the second external network. The combination network address and the temporary foreign network address are used to send data received on the first network to the mobile first network device on the second network.

In one preferred embodiment of the present invention, the distributed network address translation system includes a mobile first network device on a first network with a combination network address from a Port Allocation Protocol, capable of roaming from the first network to a second external network. The combination network address from the Port Allocation Protocol address allows distributed network address translation and includes a locally-unique port on the first network and an external network address for the first network to identify the first network to the external second network. An immobile second network device on the first network sends data to the mobile first network device using the combination network address from the Port Allocation Protocol when the mobile first network device roams to the external second network The method and system of a preferred embodiment of the present invention may allow mobile network devices using Mobile Internet Protocol to use distributed network address translation. Distributed network address translation may allow mobile network devices to share a smaller number of globally-routable network addresses with immobile network devices on the same subnet.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present inventions are described with reference to the following drawings, wherein:

FIG. 3 is a block diagram illustrating a port allocation protocol ("PAP");

FIG. 11 illustrates a source port transition table layout;

FIG. 12 illustrates an Internet Protocol address translation table layout;

DETAILED DESCRIPTION OF PREFERRED EMBODIMENTS

Exemplary Network System

Figure 1:
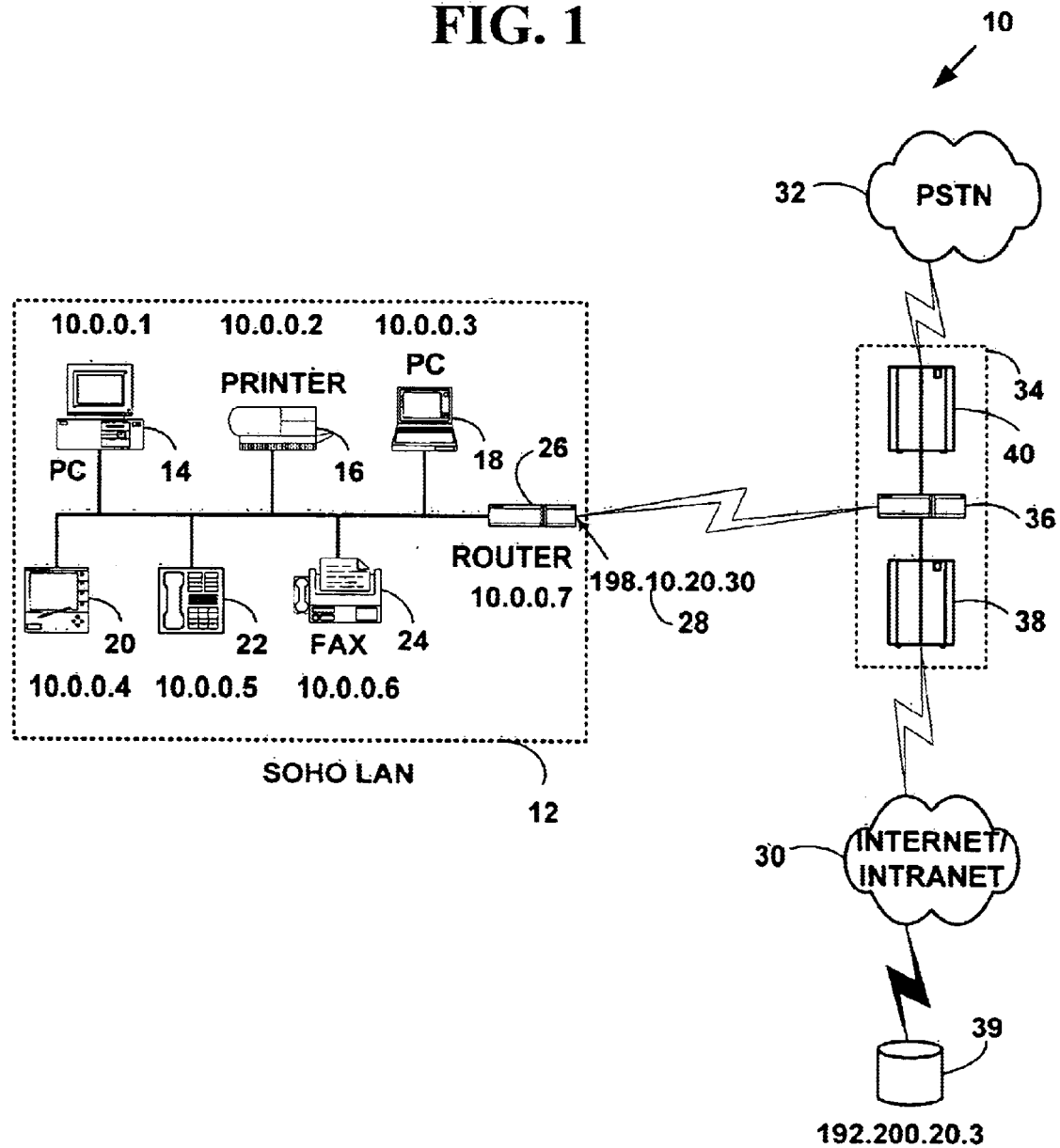
FIG. 1 is a block diagram illustrating a network system for distributed address translation.

FIG. 1 is a block diagram illustrating a network system 10 for a preferred embodiment of the present invention. Network system includes a first computer network 12 with multiple network devices (14, 16, 18, 20, 22, 24) and a router 26 to route data packets to another external computer network. The multiple network devices include any of computers (14, 18), printers 16, facsimile devices 24, hand-held devices 20, telephones 22 or other network devices not illustrated in FIG. 1. First computer network 12 has a external common network address 28 (e.g., an IP address 198.10.20.30) to identify first network 12 to an external computer network such as a second computer network 30 and/or a third computer network 32 external to first computer network 12. The multiple network devices (14, 16, 18, 20, 22, 24, and 26) have an internal network address for first computer network 12 (e.g., 10.0.0.x explained below). A network access service provider 34 with a router 36 routes data packets to/from first computer network 12 to second computer network 30 and/or third computer network 32 through a second network switch 38 and/or a third network switch 40. In one embodiment of the present invention, first network 12 is a Small Office/Home Office ("SOHO") Local Area Network ("LAN"), also called a "legacy" LAN, second network 30 is the Internet or an intranet, and third network 32 is a Public Switched Telephone Network ("PSTN"). However, other network types and network components can also be used and the present invention is not limited to the network types and network components described for a preferred embodiment.

An operating environment for network devices and router of the present invention include a processing system with at least one high speed Central Processing Unit ("CPU") and a memory. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In network address translation schemes known in the art, router 26 translates an internal network address such as an internal IP address used on first network 12 to an external network address such as an IP address for outgoing traffic to second network 30 or third network 32. Router 26 also translates an external network address to an internal network address for incoming traffic from second network 30 or third network 32. A NAT router assumes the entire computation burden for network address translation. For large stub networks for 50 or more network devices, the NAT router becomes a bottleneck. In the worst case, every packet passing through the NAT router will require address translation. For more information on network address translation for the Internet Protocol see "The IP Network Address Translator (NAT)," Internet Engineering Task Force ("IETF") Request For Comments ("RFC") RFC-1631, and "NAT Bypass for 'End 2 End' sensitive applications," by G. Tsirtsis and A. O'Niell, IETF Internet Draft, <draft-tsirtsis-nat-bypass-00.txt>, January 1998. The IETF World-Wide-Web site on the Internet can be reached at the Uniform Resource Locator ("URL") "www.itef.org."

In a preferred embodiment of the present invention, Distributed Network Access Translation ("DNAT") is used. Network devices (14, 16, 18, 20, 22, 24) on first computer network 12 request a set of globally unique ports from router 26 for external communications with external second network 30 or third network 32. Network devices (14, 16, 18, 20, 22, 24) replace local or default or ephemeral ports with the globally unique ports and use a combination network address including the globally unique port and a common external network address (e.g., an IP address) for communications with the external networks 30 and 32. A default port is typically statically assigned. An ephemeral port is typically dynamically assigned for a duration of time.

DNAT Protocol Stack

Figure 2:
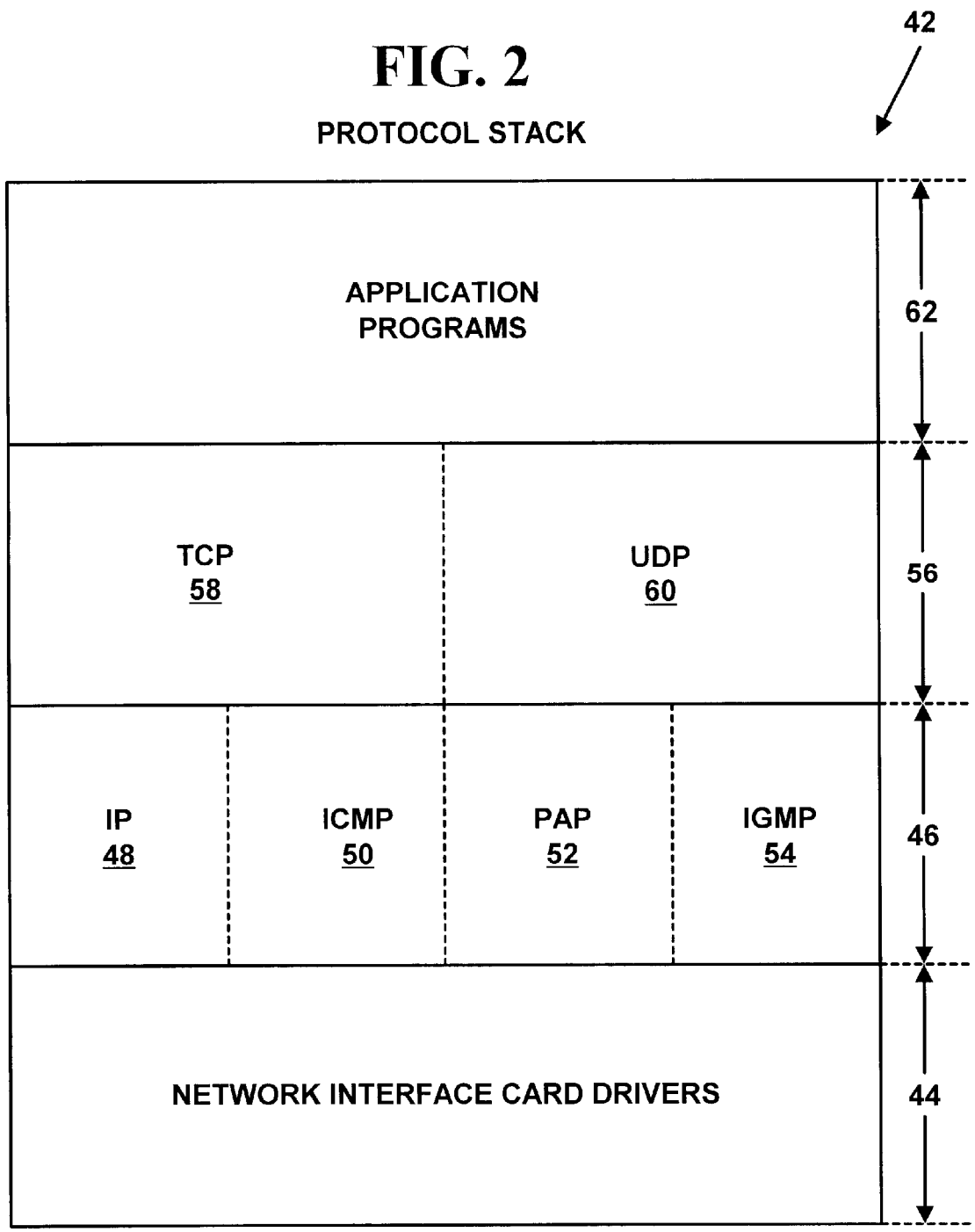
FIG. 2 is a block diagram illustrating a protocol stack for a network device.

FIG. 2 is a block diagram illustrating a layered protocol stack 42 for a network device from first network 12 used for DNAT. Layered Protocol stack 42 is described with respect to Internet Protocol suites comprising from lowest-to-highest, a link, network, transport and application layer. However, more or fewer layers could also be used, and different layer designations could also be used for the layers in protocol stack 42 (e.g., layering based on the Open Systems Interconnection ("OSI") model).

Network devices (14, 16, 18, 20, 22, and 24) are connected to first network 12 with a link layer 44. Link layer 44 includes Network Interface Card ("NIC") drivers for the hardware network devices connecting the network devices to computer network 12. Above link layer 44 is a network layer 46. Network layer 46, includes an IP layer 48. As is known in the art, IP 48 is an addressing protocol designed to route traffic within a network or between networks. IP layer 48, hereinafter IP 48, is described RFC-791, incorporated herein by reference.

In addition to IP 48, three other protocol layers are used in network layer 46: Internet Control Message Protocol ("ICMP") layer 50, Port Allocation Protocol ("PAP") layer 52 and Internet Group Management Protocol ("IGMP") layer. However, more or fewer protocols could also be used.

ICMP layer 50, hereinafter ICMP 50, is used for network management. The main functions of ICMP 50 include error reporting, reachability testing (e.g., "pinging") congestion control, route-change notification, performance, subnet addressing and other maintenance. For more information on ICMP 50 see RFC-792, incorporated herein by reference.

PAP layer 52 allocates globally unique ports to a network device. In one embodiment of the present invention, PAP layer 52, is a separate protocol layer in network layer 46. In another embodiment of the present invention, PAP layer 52 is implemented as part of ICMP layer 50 and is not a separate protocol layer. PAP layer 52 is explained below.

IGMP layer 54, hereinafter IGMP 54, is responsible for User Datagram Protocol ("UDP") broadcasting or multicasting, such as sending UDP packets to an IP 48 device or to multiple IP devices on a network. IGMP 54 can also be used with a Transmission Control Protocol. For more information on IGMP 54 see RFC-1112, incorporated herein by reference.

Above network layer 46 is a transmission layer 56. Transmission layer 56 includes a Transmission Control Protocol ("TCP") layer 58 and a UDP layer 60. TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see RFC-793, incorporated herein by reference.

UDP layer 60, hereinafter UDP 60, provides a connectionless mode of communications with datagrams in an interconnected set of computer networks. UDP 60 provides a transaction oriented datagram protocol, where delivery and duplicate packet protection are not guaranteed. For more information on UDP 60 see RFC-768, incorporated herein by reference.

Both TCP 58 and UDP 60 are not required in protocol stack 52. Either TCP 58 or UDP 60 can be used without the other. If only TCP 58 is used, then IGMP 54 and UDP 60 may be removed from protocol stack 42. If only UDP 60 is used, IGMP 50 and TCP 58 may be removed from protocol stack 42. However, UDP 60 can also be used with ICMP 50 and IGMP 54 without TCP 50.

Above transmission layer 56 is an application layer 62 where application programs to carry out desired functionality for a network device reside. For example, the application programs for network device 16 include printer application programs, while application programs for network device 24 include facsimile application programs more or fewer protocol layers can also be used in protocol stack 42.

DNAT Protocol

FIG. 3 is a block diagram illustrating a Port Allocation Protocol ("PAP") 64. PAP 64 is implemented in a separate PAP layer 52 or as an integral part of ICMP 50 in protocol stack 42 (FIG. 2). PAP 64 includes a PAP request message 66, a PAP response message 68, a PAP invalidate message 70 and a combination network address 72. Fields in the PAP messages (66, 68, and 70) follow standard ICMP 50 message format. However, other message layouts (i.e., Non-ICMP 50 message format) and more or fewer messages could also be used for PAP 64 messages.

Figure 4:
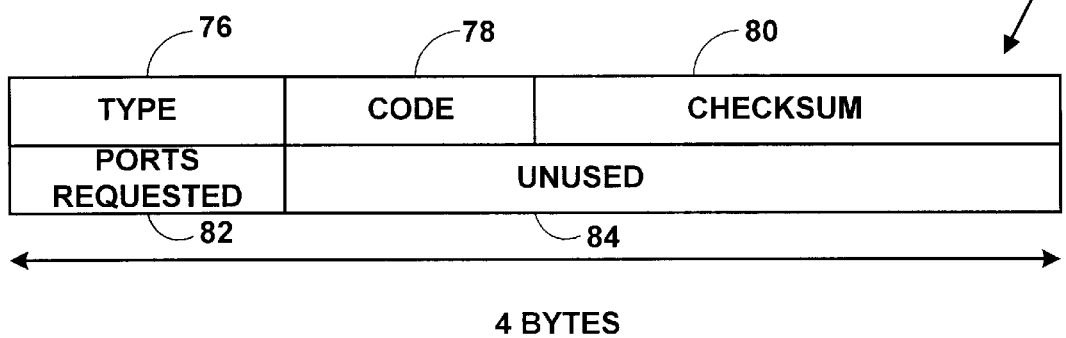
FIG. 4 is a block diagram illustrating a PAP request message layout.

In a preferred embodiment of the present invention, PAP request message 66 is sent from network device (14, 16, 18, 20, 22, and 24) to router 26 to request a block of globally unique port numbers. In another embodiment of the present invention, PAP 64 is used with another network device (e.g., a port server or other network device separate from router 26). FIG. 4 is a block diagram illustrating a PAP request message layout 74. Type-field 76 is one-byte and has a value of 32. Code-field 78 is one-byte and has a value of zero for ports under 10,000 and a value of 128 for ports above 10,000. Checksum-field 80 is two-bytes, and has a value of a 1's complement sum of the entire PAP request message 66 layout 74. As is known in the art, a 1's complement for a value written in binary or base-2 (i.e., has only zero's and one's) is the inverse of a existing one or zero. For example, a 1's compliment of $110_2$ is $001_2$.

Ports-requested-field 82 is one-byte and has a variable value indicating a number of globally unique ports requested by a network device. By default ports-requested-field 82 is 16 or 32, which is a reasonable number for most network devices. However, other default numbers could also be used. Unused-field 84 is three-bytes and has a value of zero. However, other layouts, values and field sizes could also be used for PAP request message 66.

In one embodiment of the present invention, a network device transmits PAP request message 66 upon boot. PAP 64 is associated with Dynamic Host Configuration Protocol ("DHCP") or BOOTstrap Protocol ("BOOTP"). DHCP is a protocol for passing configuration information such as IP 48 addresses to hosts on an IP 48 network. For more information on DHCP see RFC-1541, incorporated herein by reference. The format of DHCP messages is based on the format of BOOTP messages described in RFC-951 and RFC-1542, incorporated herein by reference. From a network device's point of view, DHCP is an extension of the BOOTP mechanism.

In another embodiment of the present invention, network devices (14, 16, 18, 20, 22, 24) request globally unique ports after boot when a protocol layer in layered protocol stack 42 makes an initial request for an external network (e.g., 30 or 32). Network devices (14, 16, 18, 20, 22, and 24) may also request globally unique ports when the number of globally unique ports required falls below the number of globally unique ports allocated.

PAP request message 66 is sent from a network device (14, 16, 18, 20, 22, and 24) to router 26 after attaching an IP 48 header or other message header. A PAP response message 68 is sent from router 26 back to network devices (14, 16, 18, 20, 22, 24) either confirming or denying PAP request message 66.

Figure 5:
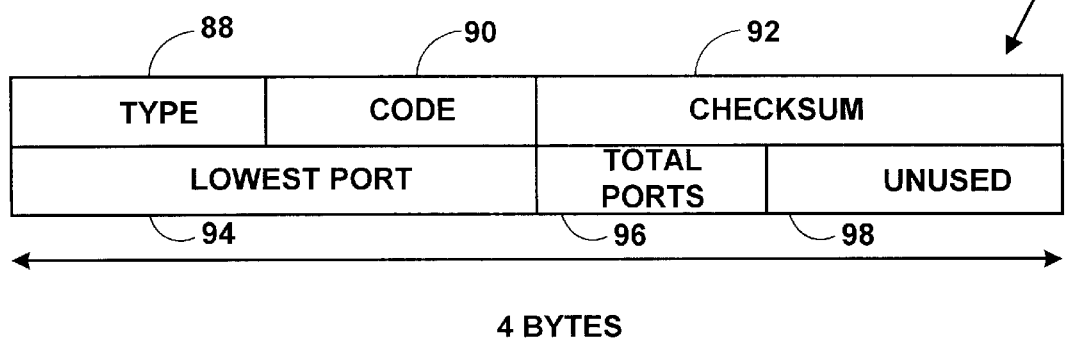
FIG. 5 is a block diagram illustrating a PAP response message layout.

FIG. 5 is a block diagram illustrating a PAP response message layout 86. Type-field 88 is one-byte and has value of 32. Code-field 90 is one-byte and has a value of zero for failure and one for success. Checksum-field 92 is two-bytes is a 16-bit 1's complement sum of the entire PAP response message 68. Lowest-port-field 94 is two-bytes and is the lowest globally unique port number allocated in a block of globally unique ports. Total-ports-field 96 is one-byte and is the total number of globally unique ports allocated to the network device. Unused-field 98 is one-byte and has a value of zero. However, other layouts, values and field sizes could also be used for PAP response message 68.

Upon receiving a successful PAP response message 68, a network device saves the block of globally unique ports that it may use. The globally unique ports are saved in a data structure with a flag-field indicating whether the globally unique port is allocated or unused. Table 1 is pseudo-code for an exemplary data structures to store globally unique port information. However, other data structures or layouts could also be used.

TABLE 1

```
struct globally_unique_ports
{
    int port_number;
    flag status:1; /* one bit flag, 0 = unused, 1 = allocated */
} gu_ports[MAX_GU];
int number_of_gu_ports; /* number of globally unique ports allocated */
```

The one or more globally unique ports are allocated to protocols and applications in layered protocol stack 42 on a network device to replace local or default ports. Upon receiving an unsuccessful PAP response message 68 the network device may send another PAP request message 66 for fewer ports. If router 26 cannot allocate a large enough block of contiguous globally unique ports for the network device, it may send a PAP response 68 with a success code, but allocate fewer globally unique ports than requested.

Figure 6:
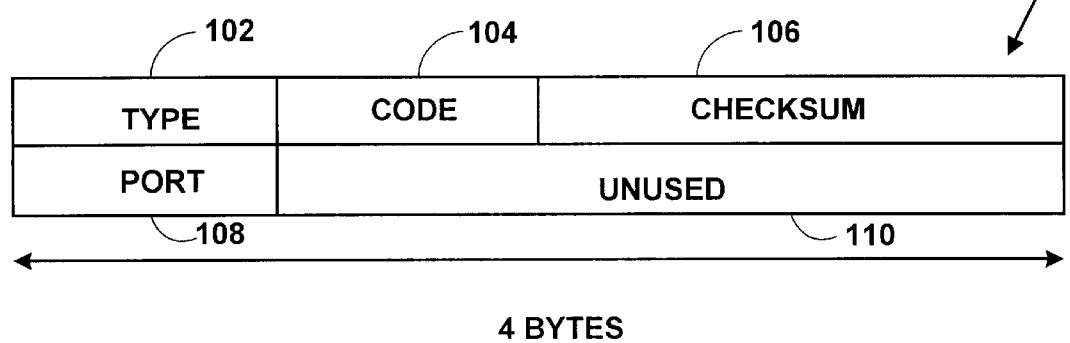
FIG. 6 is a block diagram illustrating a PAP invalidate message layout.

FIG. 6 is a block diagram illustrating a PAP invalidate message layout 100. A PAP invalidate message 70 is used to invalidate or de-allocate a block of globally unique ports currently allocated to a network device. Type-field 102 is one-byte and has a value of 32. Code-field 104 is one-byte and has a value of two. Checksum-field 106 is two-bytes and is a 1's complement sum of the entire PAP invalidate message 72. Port-field 108 is one-byte and has a value of a globally unique port number used by the network device. Unused-field 110 is three-bytes and has a value of zero. However, other layouts, values and field sizes could also be used for PAP invalidate message 70.

It is possible that two network devices may be allocated overlapping blocks of globally unique port numbers as a result of router 26 crash or reboot. Router 26 should send PAP invalidate messages 70 to invalidate all globally unique ports in use upon reboot to help prevent this problem. A network device (14, 16, 18, 20, 22, and 24) also sends a PAP invalidate message. 70 when it no longer needs a globally unique port.

Figure 7:
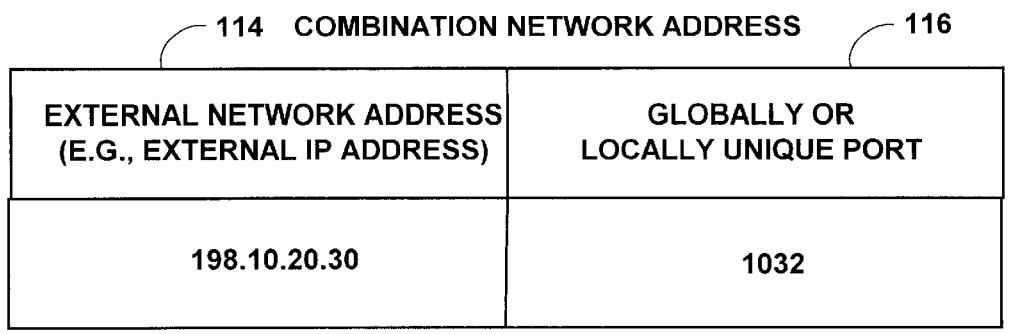
FIG. 7 is a block diagram illustrating a PAP combined network address layout.

FIG. 7 is a block diagram illustrating a combined network address layout 112 for combined network address 72. However, other layouts could also be used. Combined network address layout 112 includes a common external network address 114 such as an IP 48 address (e.g., common network address 28), and a globally unique port 116 or a locally-unique port for Mobile IP explained below, obtained by sending a PAP request message 66 and receiving a PAP response message 68 from a network device. Network devices (14, 16, 18, 20, 22, 24) use combined network address 72 for communications with external second network 30 or third network 32. Common external network address 114 identifies first computer network 12 to an external second computer network (e.g., 30 or 32).

As is known in the art, to identify separate data streams, TCP 58 provides a source port field and a source address field in a TCP header. For more information on TCP headers see RFC-793. Since local or default port identifiers are selected independently by each TCP 58 stack in a network, they are typically not unique. To provide for unique addresses within each TCP 58, a local Internet address identifying TCP 58 can be concatenated with a local port identifier and a remote Internet address and a remote port identifier to create a "socket" that will be unique throughout all networks connected together. Sockets are known to those skilled in the networking arts.

In a preferred embodiment of the present invention, the source port in a header is given a globally unique port obtained with PAP 64 and given a common external network address. Together they uniquely identify applications and protocols on network devices (14, 16, 18, 20, 22, 24) on first computer network 12 to second external computer network (e.g., 30 or 32) with a value conceptually similar to the socket used by TCP 58.

As is also known in the art, UDP 60 also has a source port field in a UDP header. For more information on UDP 60 headers see RFC-768. The UDP 60 source port is an optional field, when used, it indicates a port of the sending process, and may be assumed to be the port to which a reply should be addressed in the absence of any other information. If not used, a value of zero is inserted. A UDP 60 header also has a source address field. A globally unique port can also be used in a UDP 60 header.

In a preferred embodiment of the present invention, PAP 64 is used to create combination network address 72 that is used in TCP 58, UDP 60 header fields. In another embodiment of the present invention, the combination network address 72 is stored in other message header fields understood by router 26 (i.e., non-IP 48 TCP 58 or UDP 60 fields), first computer network 12, second computer network 30 and third computer network 32.

In a preferred embodiment of the present invention, router 26 allocates blocks of globally unique ports to network devices (14, 16, 18, 20, 22, and 24). However, other network devices could also be used to allocate globally unique ports (e.g., a port server). Router 26 maintains a port-to-internal network address table as globally unique parts are allocated. Router 26 also has an internal table indicating internal network addresses for all network devices (14, 16, 18, 20, 22, 24) on first computer network 12. In a preferred embodiment of the present invention, the internal network addresses for first computer network 12 are IP 48 addresses. For example, computer 14 has an internal IP address of 10.0.0.1 (FIG. 1), printer 16, 10.0.0.2, computer 18, 10.0.0.3, hand held computer, 20, 10.0.0.4, telephone 22, 10.0.0.5, facsimile, 24, 10.0.0.6, and router 26, 10.0.0.7 in FIG. 1. The internal addresses are not published on the external computer network (e.g., the Internet of an intranet). However, other internal network addresses could also be used (e.g., a Medium Access Control ("MAC") protocol addresses).

Figure 8:
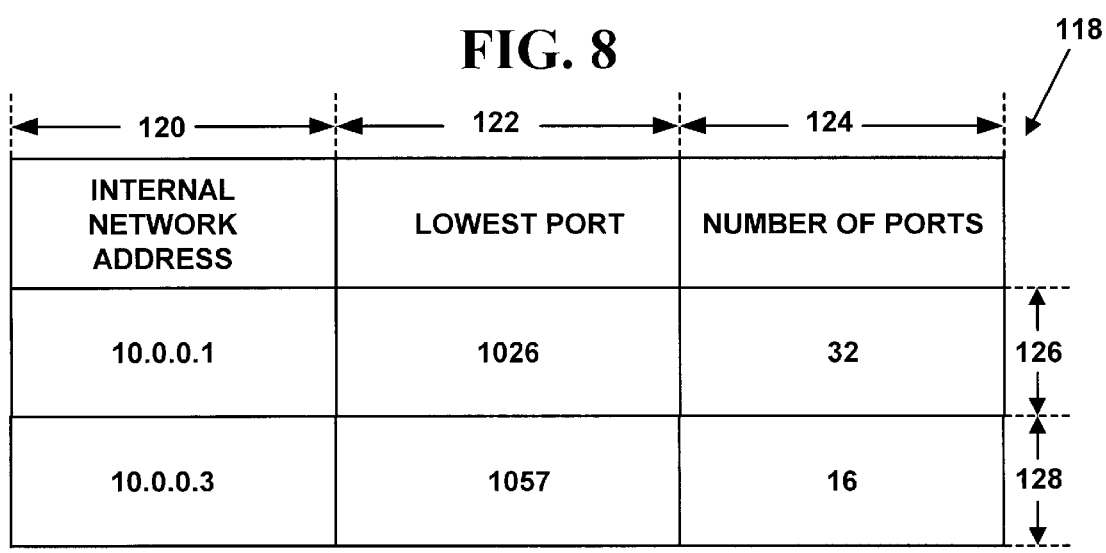
FIG. 8 is a block diagram illustrating a PAP port-to-internal network address table layout.

FIG. 8 is a block diagram illustrating a port-to-internal address table 118 layout maintained by router 26. However, other layouts and more or fewer rows and columns could also be used could also be used. Port-to-internal address table 118 layout has three columns: an internal-network-address column 120, a lowest-port column 122, and a number-of-ports column 124. However, more or fewer columns or other table layouts could also be used. First row 126 indicates that a network device has been allocated ports 1026–1057 for use with internal network address 10.0.0.1 (e.g., computer 14). A second network device has been allocated ports 1058–1073 for use with internal network address 1.0.0.3 (e.g., computer 18). An internal network address may have several entries in port-to-internal address table 118.

Distributed Network Address Translation

Figure 9:
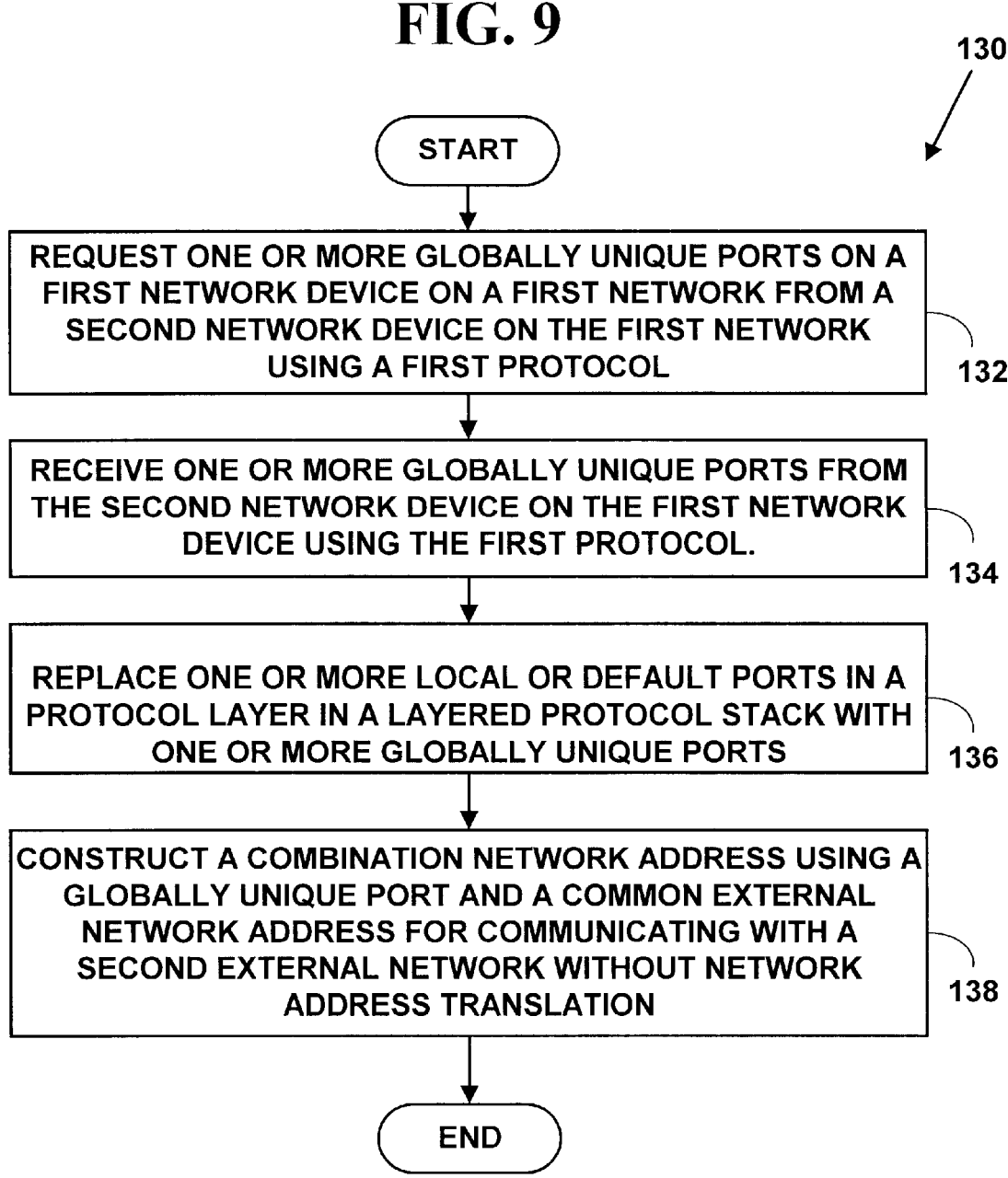
FIG. 9 is a flow diagram illustrating a method for allowing distributed network address translation.

FIG. 9 is a flow diagram illustrating a Method 130 for allowing distributed network address translation. At Step 132, a first network device on a first computer network requests one or more globally unique ports from a second network device on the first computer network with a first protocol. The globally unique ports are used to replace default ports in protocol layers in layered protocol stack 42 on the first network device. In addition, the globally unique ports are used to create a combination network address comprising a globally unique port and a common external address to communicate with a second external computer network without address translation. At Step 134, the first network device receives the one or more globally unique ports from the second network device. At Step 136, the first network device replaces one or more local or default ports used in layered protocol stack 42 with one or more globally unique ports. At Step 138, the first network device constructs one or more combination network addresses using the one or more globally unique ports and a common external network address used to identify the first computer network on the second external computer network.

In a preferred embodiment of the present invention, the first network device is any of network devices (14, 16, 18, 20, 22, 24), the second network device is router 26, the first computer network is first computer network 12 (e.g., SOHO LAN) the first protocol is PAP 64, the second external computer network is any of second computer network 30 (e.g., the Internet or an intranet) or third computer network 32 (e.g., PSTN). The combination network address includes a common IP 48 address (e.g., common network address 28) identifying network devices on first computer network 12 to a second external computer network (e.g., 30 or 32). However, the present invention is not limited to the networks, network devices, network addresses or protocols described and others may also be used.

The globally unique ports are used for entities such as protocols and applications in layered protocol stack 42 on network device and are globally unique on first computer network 12. The globally unique ports will identify a network device on first computer network 12. For example, TCP 58 typically has a default source port or ephemeral port assigned to the TCP stack (e.g., 1234). After allocation with Method 130, a network device uses a globally unique port to replace a default or local port in a protocol layer in layered protocol stack 42. As is illustrated in FIG. 8, network device 14 with internal IP 48 address 10.0.0.1 is assigned thirty-two globally unique ports in the rage of 1–32. Network device 14 may assign globally unique port-1032 to TCP 58 to use as a source port. The original default port for TCP 58 was 1234. Combination network address 112 illustrated in FIG. 7 is then assigned to TCP 58 on network device 14 for communications with an external network (e.g., 30 or 32). Other globally unique ports are assigned to other protocols and applications in layered protocol stack 42 on a network device to replace other local ports.

In one embodiment of the present invention, globally unique ports are assigned to protocol layers in layered protocol stack 42 when a network device boots. In another embodiment of the present invention, globally unique ports are assigned to protocol layers in layered protocol stack when a protocol layer makes a request for an external network (e.g., 30 or 32). In yet another embodiment of the present invention, globally unique ports are assigned dynamically or on-the-fly in an individual protocol layer as a protocol layer makes a request for an external network (e.g., 30 or 32).

The globally unique ports with common external network address 28 as combination network address 112 uniquely identify an entity on a network device to an external network (e.g., 30 or 32) without translation. Network interface card device drivers in link layer 44 maintain the actual internal IP 48 address of a network device.

Locally unique-ports are also used with the common external network address 28 as is explained below for Mobile IP. Locally-unique ports help identify a mobile network device that roams away from a home network. For Mobile IP applications, locally-unique ports replace the globally unique ports described herein.

Figure 10:
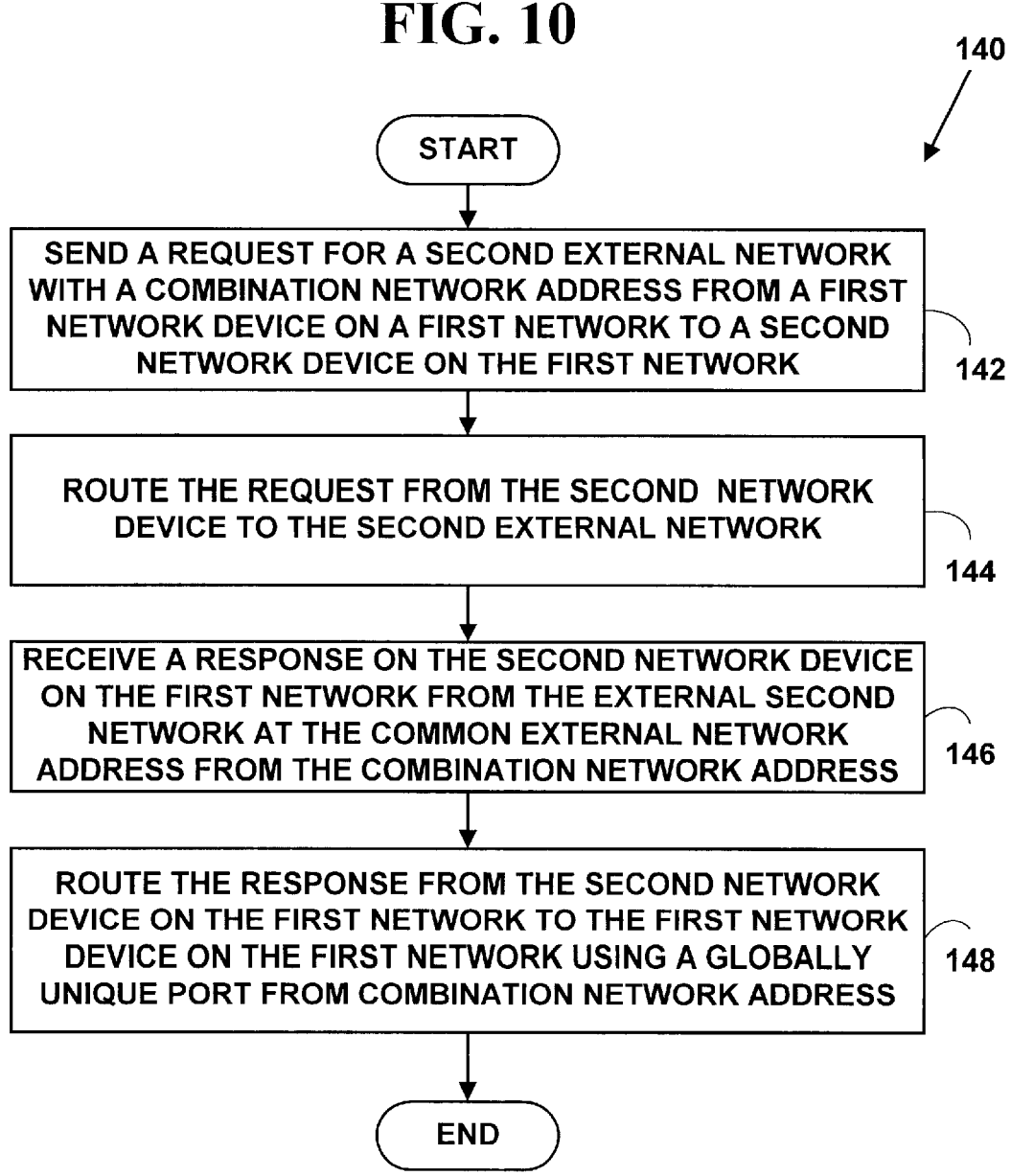
FIG. 10 is a flow diagram illustrating a method for distributed network address translation.

FIG. 10 is a flow diagram illustrating a Method 140 for distributed network address translation. At Step 142, a request is sent from a first network device on a first computer network to a second network device on the first computer network. The request is for a second external network and includes a combination network address identifying the first network device on the first network. The combination network is constructed with Method 130 (FIG. 9) and includes a globally unique port and a common external address to identify the first computer network to the second external network. At Step 144, the second network device routes the request from the first computer network to the second external network. At Step 146, the second network device on the first computer network receives a response from the external second computer network at the external network address identifying the first network from the combination network address. At Step 148, the second network device on the first computer network routes the response to the first network device on the first computer network using the globally unique port from the combination network address.

In a preferred embodiment of the present invention, the first network device is any of network devices (14, 16, 18, 20, 22, 24), the second network device is router 26. The first computer network is SOHO LAN 12, and the second computer network is second computer network 30 or third computer network 32. The combination network address includes a globally unique port obtained with PAP 64 and an external IP 48 address for an external network such as the Internet, an intranet, or another computer network. However, the present invention is not limited to the networks, network devices, network address or protocol described and others may also be used.

Method 140 (FIG. 10) is illustrated with a specific example using TCP 58/IP 48 layers from layered protocol stack 42. However, other protocol layers in layered protocol stack 42 could also be used. At Step 142, network device 14 sends a TCP 58 request to server 39. For example, a TCP 58 request for server 39 at external IP 48 address 192.200.20.3 on second computer network 30. Table 2 illustrates an exemplary request data packet sent a Step 142.

TABLE 2

| IP 48 Header | TCP 58 Header |
|---|---|
| SRC IP: 198.10.20.30 | SRC Port: 1032 |
| DST IP: 192.200.20.3 | DST Port: 80 |

The source IP 48 address is common external network address 28 (e.g., 198.10.20.30) and the source port is globally unique port-1032 obtained via PAP 64 with Method 130 and assigned to TCP 58. In one embodiment of the present invention, globally unique port-1032 replaces local port 1234 for TCP 58 when network device 14 was booted. In another embodiment of the present invention, local port 1234 is replaced with a globally unique port such as globally unique port-1032 whenever a protocol layer in layered protocol stack makes the request. The globally unique port along with the common external address comprise combination network address 112. In the preferred example, the default TCP 58 port of 1234 has been replaced with globally unique port-1 032. The destination IP address is 192.200.20.3 for server 39 (FIG. 1) on second external network 30 and the destination port is well known Internet port 80. When the request reaches a network interface card device driver in link layer 44, in layered protocol stack 42, an outer IP 48 header is added to route the request to router 26. Network interface card device drivers maintain the local internal network address (e.g., 10.0.0.x) for a network device for internal communications. Table 3 illustrates an exemplary data packet with an outer IP 48 header added for router 26.

TABLE 3

| Outer IP 48 header | Inner IP 48 header | TCP 58 header |
|---|---|---|
| SRC IP: 10.0.0.1 | SRC IP: 198.10.20.30 | SRC Port: 1032 |
| DST IP: 10.0.0.7 | DST IP: 192.200.20.3 | SRC Port: 80 |

A network interface card device driver adds the outer IP 48 header including a source IP 48 address for network device 14 of 10.0.0.1 and a destination IP 48 address of 10.0.0.7 for router 26. At Step 144, router 26 receives the request data packet, strips the outer IP 48 header, and sends the request data packet to external network 30.

At Step 146, router 26 receives a response packet from an external network (e.g., 30). An exemplary response data packet is illustrated in Table 4.

TABLE 4

| IP 48 Header | TCP 58 Header |
|---|---|
| SRC IP: 192.200.20.3 | SRC Port: 80 |
| DST IP: 198.10.20.30 | DST Port: 1032 |

Router 26 receives the response packet from external second network 30 at Step 146 with destination IP 48 address common external network address 198.10.20.30 and destination port set to globally unique port-1032. Router 26 uses port-to-internal network address table (FIG. 8) to map destination port-1032 to internal IP 48 address 10.0.0.1 for computer 14. Router 26 adds an outer IP 48 header to route the response data packet back to network device 14. Table 5 illustrates an exemplary response packet with outer IP 48 header added by router 26.

TABLE 5

| Outer IP 48 header | Inner IP 48 header | TCP 58 header |
|---|---|---|
| SRC IP: 10.0.0.7 | SRC IP: 192.200.20.3 | SRC Port: 80 |
| DST IP: 10.0.0.1 | DST IP: 198.10.20.30 | SRC Port: 1032 |

Outer IP 48 header has a source internal IP 48 address of 10.0.0.7 for router 26 and a destination internal IP 48 address of 10.0.0.1 for network device 14 on computer network 12. At Step 148, router 26 routes the response data packet to network device 14 with the outer IP 48 header. A network interface card device driver in link layer 44 in layered protocol stack 42 strips the outer IP 48 header and forwards the response data packet to network layer 46.

Network device 14 sends a request to an external network and receives a response from the external network using DNAT and globally unique port allocated with PAP 64. Router 26 does not translate any source/destination IP 48 addresses or source/destination ports. Thus, DNAT is accomplished without network address translation at router 26.

An preferred embodiment of the present invention is described with respect to a single common external network address identifying multiple network devices on first computer network 12 and used in combination network address 112 with a globally unique port. However, the present invention is not limited to a single common external network address and can also be practiced with a multiple common external network addresses as long as the number of multiple common external network addresses remains a reasonably small number (e.g., <10).

Distributed network address translation using Method 130 (FIG. 9) and Method 132 (FIG. 10) removes the computation burden of NAT at router 26 and allows multiple network devices to use a single or a small number of external network addresses known to an external network such as the Internet or an intranet. Instead of providing NAT, router 26 routes data packets from a network device (14, 16, 18, 20, 22, 24) on first computer network 12 to a second external computer network such as second computer network 30 or third computer network 32 using the combination network address. In addition, router 26 is no longer required to support multiple application protocols from layered protocol stack 42.

Router 26 also routes data packets from the second external computer network back to a network device on the first computer network using the globally unique port in the combination network address. Router 26 is no longer required to replace an internal network address with an external network address for outbound traffic, and replace an external network address with an internal network address for inbound traffic. Thus, DNAT of the present invention removes the computational burden of NAT from router 26 and does not violate the Internet principal of providing end-to-end transmission of data packets between network devices without alternations.

DNAT with Port Translation

In another embodiment of the present invention, DNAT is accomplished without modifying protocols or applications in layered protocol stack 42 above link layer 44. However, in such an embodiment, a link layer 44 in network devices (14, 16, 18, 20, 22, 24) is used to translate default or local ports on-the-fly to/from globally unique ports reserved by a network device with PAP 64. In addition, link layer 44 supports multiple protocols from layered protocol stack 42 above link layer 44 for DNAT with port translation.

As an example, suppose computer 14 (FIG. 1) with internal IP 48 address 10.0.0.1 makes a TCP 58/IP 48 request from a server on second computer network 32 (e.g., the Internet) at external IP 48 address 192.200.20.3 (i.e., web server 39, FIG. 1). The initial TCP 58 packet reaching network interface card device driver in link layer 44 of layered protocol stack 42 is illustrated in Table 6.

TABLE 6

| IP 48 Header | TCP 58 Header |
|---|---|
| SRC IP 198.10.20.30 | SRC Port: 1234 |
| DST IP 192.200.20.3 | DST Port: 80 |

The local source port for TCP 58 is 1234, the destination port is well known port 80 for the Internet, the source IP 48 address is common external network address 28 and the destination address is external IP 48 address for server 39 (FIG. 1).

In the preferred embodiment discussed above using Methods 130 and 140 of FIGS. 9 and 10, application and/or protocol local default ports are modified by a network device to use a globally unique port obtained via PAP 64 in protocol layers above link layer 44. However, for DNAT with port translation, ports are not translated in protocol layers above link layer 44 in layered protocol stack 42 are not modified. Network interface card device drivers in link layer 44 instead provide port and address translation. In such an embodiment, a network interface card device driver will determine that a connection is being initiated. An entry in a Source Port Translation Table ("SPTT") in a network interface card device driver is created.

FIG. 11 illustrates a SPTT layout 150. However, other layouts, field sizes and values could also be used. Local-port field 152 is two-bytes and is the port number used by TCP 58 of a network device. Global-port 154 field is two-bytes and is a globally unique port number used for external communications allocated by PAP 64. Protocol-field 156 is one-byte and has a value of zero for TCP 58 and a value of one for UDP 60. Timestamp-field 158 is four-types and have a value of a current system time in milliseconds updated every time this entry is used.

TCP 58 source port 1234 is translated into a globally unique port allocated by PAP 64 by a network interface card device driver in link layer 44. TCP 58 source port 1234 is not translated in TCP 58 layer or any other protocol layer above the link layer in layered protocol stack 42. An entry is added to SPTT 150. Table 7 illustrates an exemplary SPTT 150 table entry.

TABLE 7

| Local Port | Globally Unique Port | Protocol | Timestamp |
|---|---|---|---|
| 1234 | 1032 | 1 (TCP) | 10023 |

After translation by the network interface card driver, an outer IP 48 header is added to the data packet. The outer IP header is used for routing. The outer IP header has the internal address of the network device as a source IP 48 address (e.g., 10.0.0.1) and the internal network address of router 26 (e.g., 10.0.0.7) as a destination address. Table 8 illustrates the data packet with the outer IP 48 header.

TABLE 8

| Outer IP 48 Header | Inner IP 48 Header | TCP 58 Header |
|---|---|---|
| SRC IP 10.0.0.1 | SRC IP 198.10.20.30 | SRC port 1032 |
| DST IP 10.0.0.7 | DST IP 192.200.20.3 | DST port 80 |

Upon receiving the data packet illustrated in Table 4, router 26 examines the source port (e.g., 2) and the outer IP 48 source address (e.g., 10.0.0.1) to ensure a network device is using a valid globally unique port assigned to the network device.

Router 26 maintains an IP Address Translation Table ("IAPTT"). FIG. 12 illustrates a IAPTT layout 160. However, other layouts, field sizes and values could also be used. Destination port-field 162 is two-bytes and holds a globally unique port obtained with PAP 64. Internal destination IP address-field 164 is four-bytes and is the internal IP 48 address (e.g., 10.0.0.1) of a network device using the globally unique port in destination port-field 162. Protocol-field 166 is one-byte and has a value of zero for TCP 58 or a value of one for UDP 60. Timestamp-field 168 is four-types and have a value of a current system time in milliseconds updated every time this entry is used. Table 9 illustrates an exemplary IPATT 160 table entry.

TABLE 9

| Destination Port (globally unique port) | Internal Destination IP 48 Address | Protocol | Timestamp |
|---|---|---|---|
| 1032 | 10.0.01 | 1 (TCP) | 10048 |

Table 9 illustrates that globally unique port-1032 is associated with internal IP 48 address 10.0.0.1 (e.g., computer 14) for TCP 58 protocol.

Router 26 strips off the outer IP 48 header illustrated in Table 4 and sends the data packet comprising the inner IP 48 header and TCP 58 header to external network 30.

A response data packet arrives from an external network on common external network address 28 (e.g., 198.10.20.30). An arriving packet contains the headers illustrated in Table 10.

TABLE 10

| IP 48 Header | TCP Header |
|---|---|
| SRC IP 192.200.20.3 | SRC Port: 80 |
| DST IP 198.10.20.30 | DST Port: 1032 |

Router 26 looks up destination port 2 (i.e., globally unique port 2) in IPATT 158 (Table 9) and finds local network address 10.0.0.1 (e.g., computer 14). Router 26 then creates an outer IP 48 header such as the exemplary IP 48 header illustrated in Table 11. The outer IP 48 header has a source IP 48 address for router 26 and a destination IP 48 address for network device 14.

TABLE 11

| Outer IP 48 Header | Inner IP 48 Header | TCP 58 Header |
|---|---|---|
| SRC IP 10.0.0.7 | SRC IP 192.200.20.3 | SRC port 80 |
| DST IP 10.0.0.1 | DST IP 198.10.20.30 | DST port 1032 |

Router 26 then transmits the data packet illustrated in Table 11 to the appropriate network device (e.g., computer 14 at internal address 10.0.0.1). Upon receiving the data packet, a network interface card driver looks up the destination port (e.g., 2) in SPTT 148 (e.g., Table 7) finding a mapping to TCP 58 port 1234. Globally unique port-1032 is re-translated back to TCP 58 local port 1234 in link layer 44. No translation is done above link layer 44. Outer IP 48 header is then stripped. The data packet is forwarded to IP 48 in network layer 46. Table 12 illustrates the forwarded data packet.

TABLE 12

| Inner IP 48 header | TCP 58 header |
| --- | --- |
| SRC IP 192.200.20.3 | SRC Port 80 |
| DST IP 198.10.20.30 | DST Port 1234 |

The end of the connection is detected by both router 26 and network device 14. Upon end of connection, the entries in the SPTT 148 and IPATT 160 tables are removed from router 26 and network interface card driver.

Figure 13:
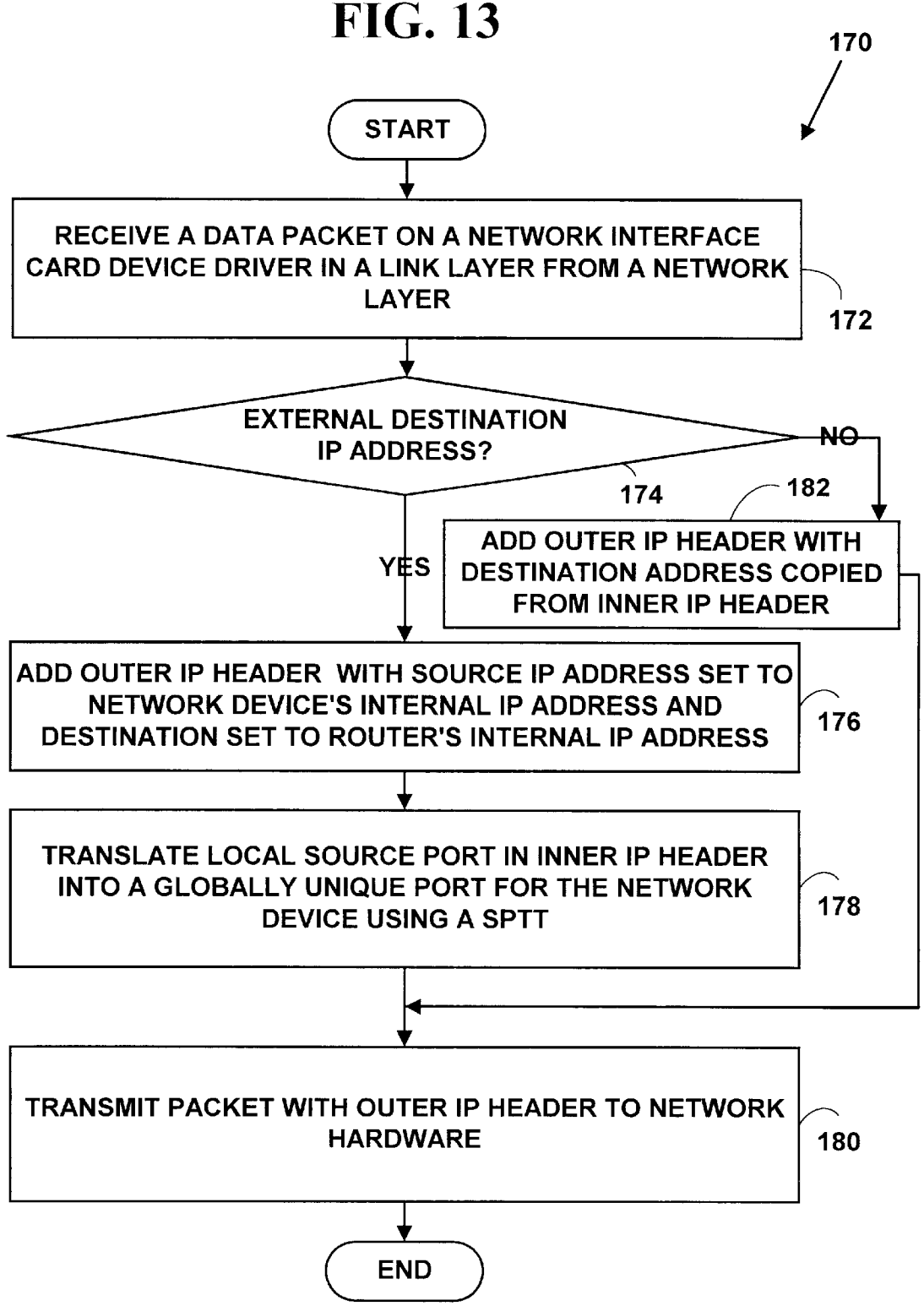
FIG. 13 illustrates a method for outbound distributed network address translation using port translation.

FIG. 13 illustrates a Method 170 for outbound distributed network address translation using port translation. At Step 172, a network interface card device driver in link layer 44 receives a data packet from network layer 46 packet (e.g., Table 6). At Step 174, the network interface card device driver conducts a test to determine if a destination network address (e.g., 192.200.20.3) is for an external network (e.g., 30 or 32). If so, at Step 176, the network interface card device driver adds an outer IP 48 header to the data packet with the source address set to the network device's internal IP 48 address (e.g., 10.0.0.1) and the destination address set to the router 26 internal address (e.g., 10.0.0.7) as (e.g., Table 8). At Step 178, a local source port for the application or protocol from the header (e.g., TCP 58 port 1234) is translated into a globally unique port (e.g., 2) obtained via PAP 64 with SPTT 150 (e.g., Table 7). At Step 180, the data packet with the outer IP 48 header is transmitted to network interface card hardware, which forwards to data packet to router 26.

If the test at 174 determines that the destination network address is for internal network 12, then at Step 182, an outer IP 48 header is added to the data packet with the destination address in the outer IP 48 header copied from the inner IP 48 destination address. The data packet with the outer IP 48 header is transmitted to network interface card hardware, which forwards the data packet to router 26 at Step 180. The local or default source port is not translated to a globally unique port for internal communications.

Using Method 170, distributed network address translation is done by a network interface card device driver, and no port translation occurs above link layer 44. However, other software or hardware modules or drivers in link layer 44 besides a network interface card device driver could also translate ports with Method 170.

Figure 14:
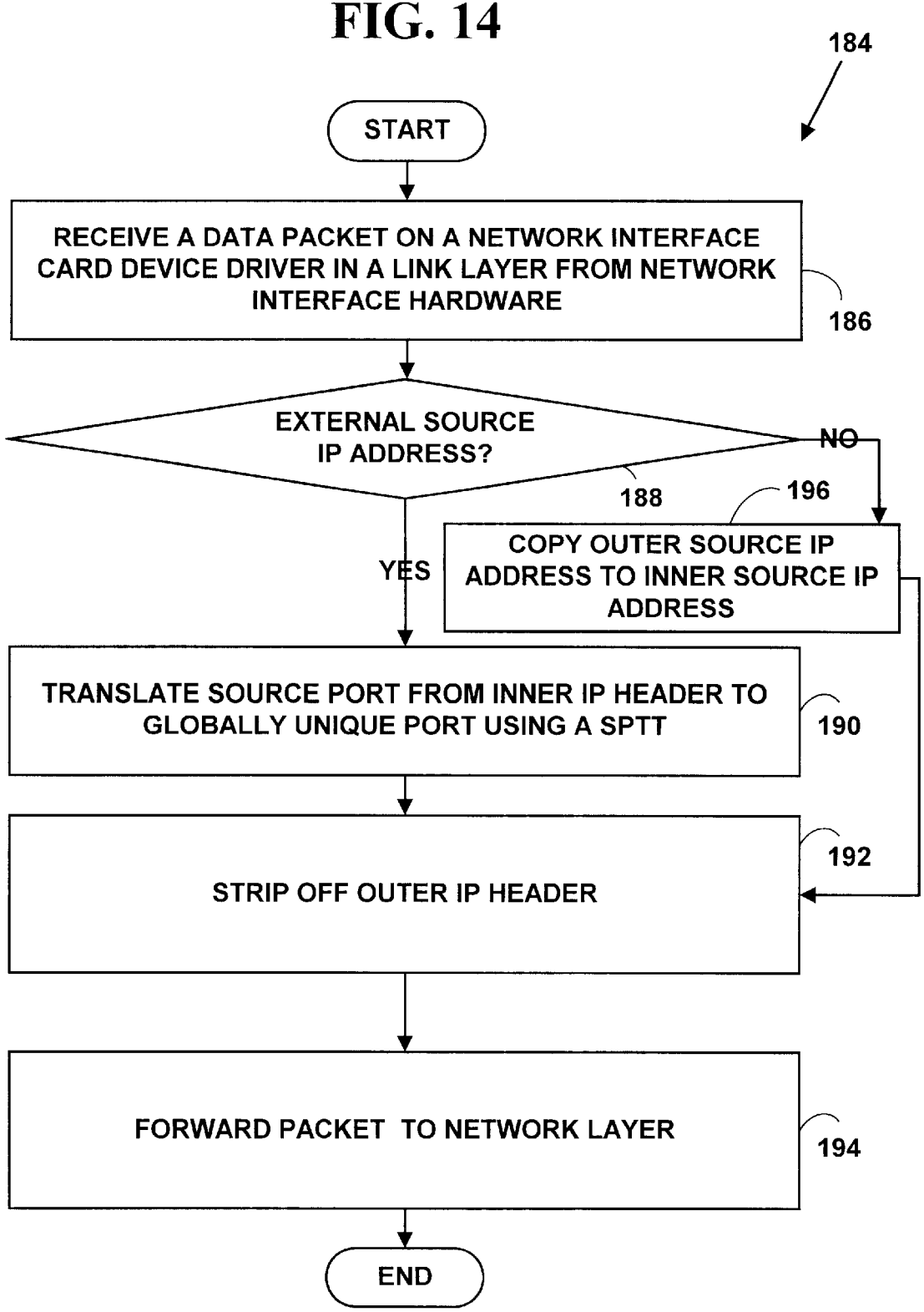
FIG. 14 illustrates a method for inbound distributed network address translation using port translation.

FIG. 14 is a flow diagram illustrating a Method 184 for inbound distributed network address translation using port translation. At Step 186, a data packet is received on a network interface card driver in link layer 44 (e.g., Table 11) from router 26. Router 26 received the data packet from external network 30 or 32 and added an outer IP 48 header. At Step 188, a test is conducted to determine if the source IP 48 address from the inner IP 48 header is an external IP 48 address. If so, at Step 190 the destination port from the inner IP 48 header is translated from a globally unique port to a local port (e.g., 2→1234) using SPATT 158 (Table 7).

At Step 192, the outer IP 48 header is stripped off. At Step 192, the data packet (e.g., Table 12) is forwarded to network layer 46.

If the test at Step 188 determines that the source IP 48 address is for internal network 12, then at Step 196 the source IP address from the outer IP 48 header is copied to the inner source IP address. At Step 192, the outer IP 48 header is stripped off. At Step 194, the data packet is forwarded to network layer 46. The default or local source port is not translated to a globally unique port for internal communications.

Using Method 184, distributed network address translation is done by a network interface card device driver, and no port translation occurs above link layer 44. However, other software or hardware modules or drivers in link layer 44 besides a network interface card device driver could also translate ports with Method 184.

DNAT (FIG. 9 & FIG. 10) does port translation in individual protocol layers in layered protocol stack 42. The port translation is done at boot time for a network device, or dynamically in a protocol layer when a protocol layer makes a request to an external network (e.g., 30 or 32).

In contrast, DNAT with port translation (FIG. 13 & FIG. 14) does port translation in link layer 44 on a network device. No ports are translated in protocol layers above link layer 44. In addition, link layer 44 supports multiple protocols from layered protocol stack 42 above link layer 44 for DNAT with port translation. For outbound data, a local port assigned to an application or protocol is translated to a globally unique port on-the-fly in link layer 44. For inbound data, the network device translates a globally unique port back to a local port on-the-fly in link layer 44. DNAT with on-the-fly port translation in link layer 44 (FIGS. 13 & 14) places more computational overhead on a network device than DNAT with port translation in individual protocol layers (FIG. 10).

However, DNAT with on-the-fly port translation in link layer 44 (FIGS. 13 & 14) is still preferred over non-distributed NAT in router 26 with Methods known in the art since computational costs for translation are distributed among a number of network devices and not concentrated in router 26. Router 26 does not translate any addresses for the described embodiments of the present invention.

For additional information on DNAT see "Distributed Network Address Translation" by M. S. Borella, D. Grabelsky, I. Sidhu and B. Petry, IETF Internet draft document <draft-borella-dnat-aatn-00.txt>, April 1998. The method and protocol for distributed network address translation described above can also be used with Mobile IP.

Mobile IP

The Mobile Internet Protocol allows "mobile" nodes to transparently move between different Internet Protocol subnetworks ("subnets"). Mobile Internet Protocol allows a mobile node to dynamically change its network connectivity in a manner that is transparent to protocol layers above IP 48 (e.g., TCP 58 or UDP 60). For more information on Mobile IP see "Mobile IP: The Internet Unplugged," by J. D. Solomon, Prentice-Hall, 1998, ISBN-0-13-856246-6, and "IP Mobility Support" in RFC-2002, both incorporated herein by reference.

Figure 15:
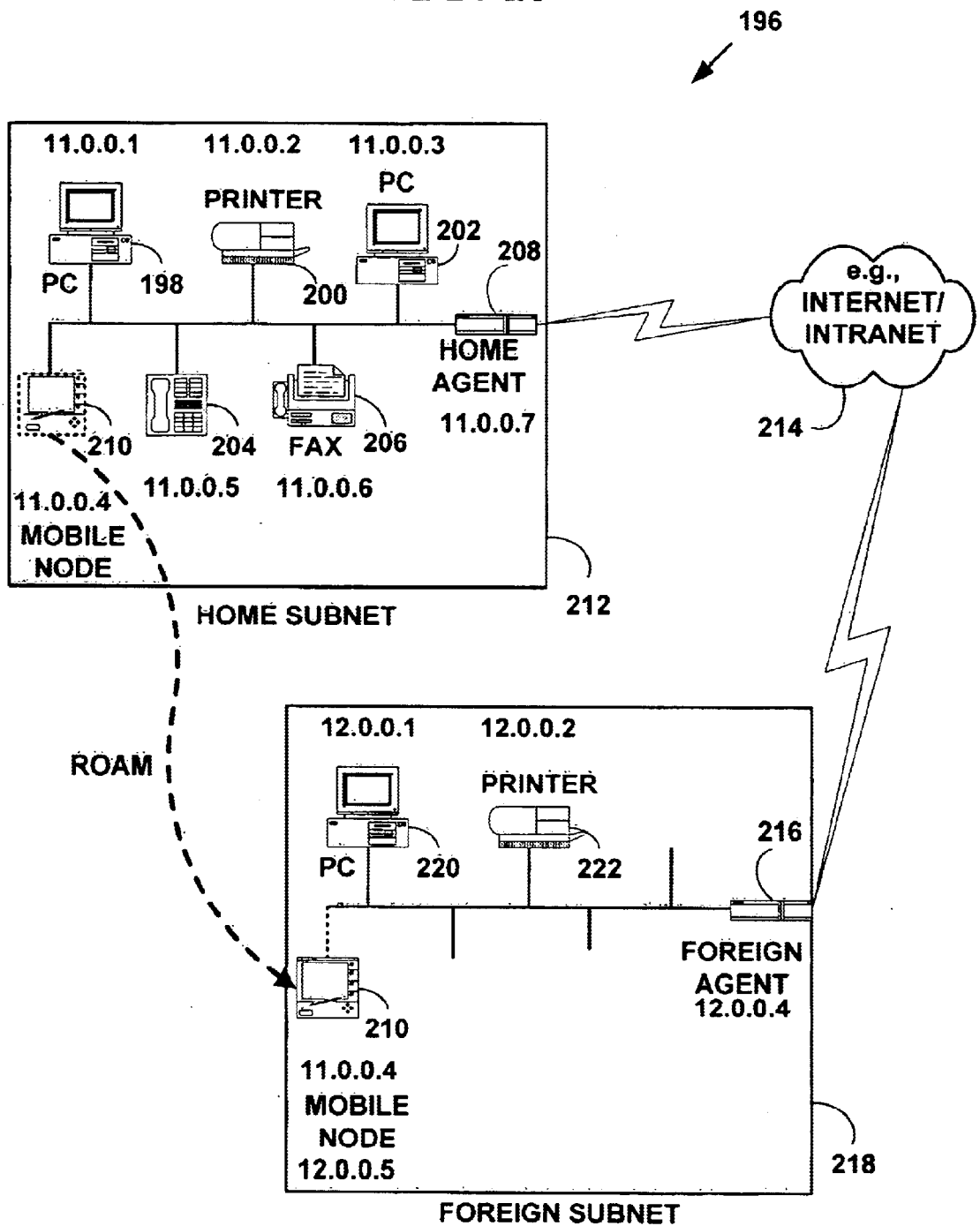
FIG. 15 is a block diagram illustrating an exemplary Mobile Internet Protocol system.

FIG. 15 is a block diagram illustrating an exemplary mobile IP system 196. The mobile IP system 196 includes one or more "immobile" network devices 198, 200, 202, 204, 206, 208, six of which are illustrated, and a mobile network device 210, one of which is illustrated.

Hereinafter the mobile network device 210 is called a "mobile node 210." However, more or fewer immobile network devices or more mobile network devices can also be used. The immobile network devices 198, 200, 202, 204, 206, 208 and the mobile node 210 are assigned a network addresses on a Home Subnet ("HS") 212 as is illustrated in FIG. 15. The home subnet 212 is connected to an external network 214 such as the Internet or an intranet via a Home Agent ("HA") 208. The home agent 208 is a "gateway router" for the home subnet 212. As is known in the art, a gateway connects computer networks using different networking protocols or operating at different transmission capacities. As is known in the art, a router translates differences between network protocols and routes data packets to an appropriate network node or network device.

When mobile node 210 "roams" way from its home subnet 212, it periodically transmits Mobile IP "agent solicitation" messages to foreign agents, such as Foreign Agent ("FA") 216 (i.e., foreign with respect to home subnet 212) via external network 214. The foreign agent 216 resides on a foreign subnet 218 with one or more foreign immobile network devices 220, 222, two of which are illustrated. The foreign subnet 218 may also include one or more mobile nodes (not illustrated in FIG. 15). The foreign agent 216 is a gateway router for the foreign subnet 218. The foreign immobile network devices 220, 222 are assigned network addresses (e.g., IP 48 addresses) on the foreign subnet 216 as is illustrated in FIG. 15.

Roaming mobile node 210 listens for mobile IP "agent advertisement" messages from foreign agents (i.e., foreign gateway routers such as foreign agent 16). When roaming mobile node 210 receives an agent advertisement message from a foreign agent indicating that it is now on a foreign subnet (e.g., foreign subnet 218), mobile node 210 registers with the foreign agent (e.g., foreign agent 216) and its home agent (e.g., home agent 208) indicating that the mobile node 210 has roamed away from its home subnet 212.

As is illustrated in FIG. 15, the mobile node 210 has a network address (e.g., IP 48 address ) of 11.0.0.4 on the home subnet 212. The home agent 208 has a network address of 11.0.0.7 on the home subnet 212. The mobile node 210 with network address 11.0.0.4, belongs to the home subnet 212 with network access prefix of 11.0.0 and a prefix length of 24 bits (i.e., 11.0.0.X/24). Network devices on the home subnet 212 have network addresses beginning with the network access prefix of 11.0.0 and a prefix length of 24 bits. Since the home agent 208 is advertising a route to the home subnet 212 at 11.0.0.X/24, it will accept data packets from external network 214 for network addresses with the network access prefix 11.0.0.X/24. For example, the home agent 208 accepts data packets for the mobile node 210 that has a home network address of 11.0.0.4, where X=4 since the network access prefix is equal to 11.0.0 with a length of 24-bits.

The foreign agent 216 has a network address of 12.0.0.4 on the foreign subnet 218. The foreign agent advertises a route to the foreign subnet 218 with network access prefix/ prefix length of 12.0.0.Y/24. The foreign agent 216 will accept data packets that have a network address of 12.0.0.Y/24 on the foreign subnet 218. For example, the foreign agent will accept data packets for the computer 220 with a network address of 12.0.0.1, where Y=1, since the network access prefix is equal to 12.0.0 with a length of 24-bits.

The mobile node 210 uses its home network address of 11.0.0.4 on the home subnet 212 to register with the foreign agent 216 and the home agent 208. After registration of the mobile node 210, the foreign agent 216 will also accept data packets for the mobile node 210 at the specific home network address 11.0.0.4/ for the mobile mode 210 as well as data packets that have a network prefix of 12.0.0/24. The foreign agent 216 also assigns a temporary foreign network address on the foreign subnet 218 to the mobile node 210 (e.g., 12.0.0.5).

The network addresses illustrated in FIG. 15 are "globally routable." The globally routable network addresses on the home subnet 212 and the foreign subnet 218 are reachable via the external network 214. This is not the case for network devices on the first computer network 12 (FIG. 1). The private network addresses illustrated for network devices 14, 16, 18, 20, 22 and 24 in first computer network 12 (e.g., on the exemplary SOHO LAN in FIG. 1) are not globally routable. The external network address 28 of 198.10.20.30 in FIG. 1 is used to transfer data to/from first network device 12 using DNAT as was described above since the private network addresses are not globally routable.

Figure 16:
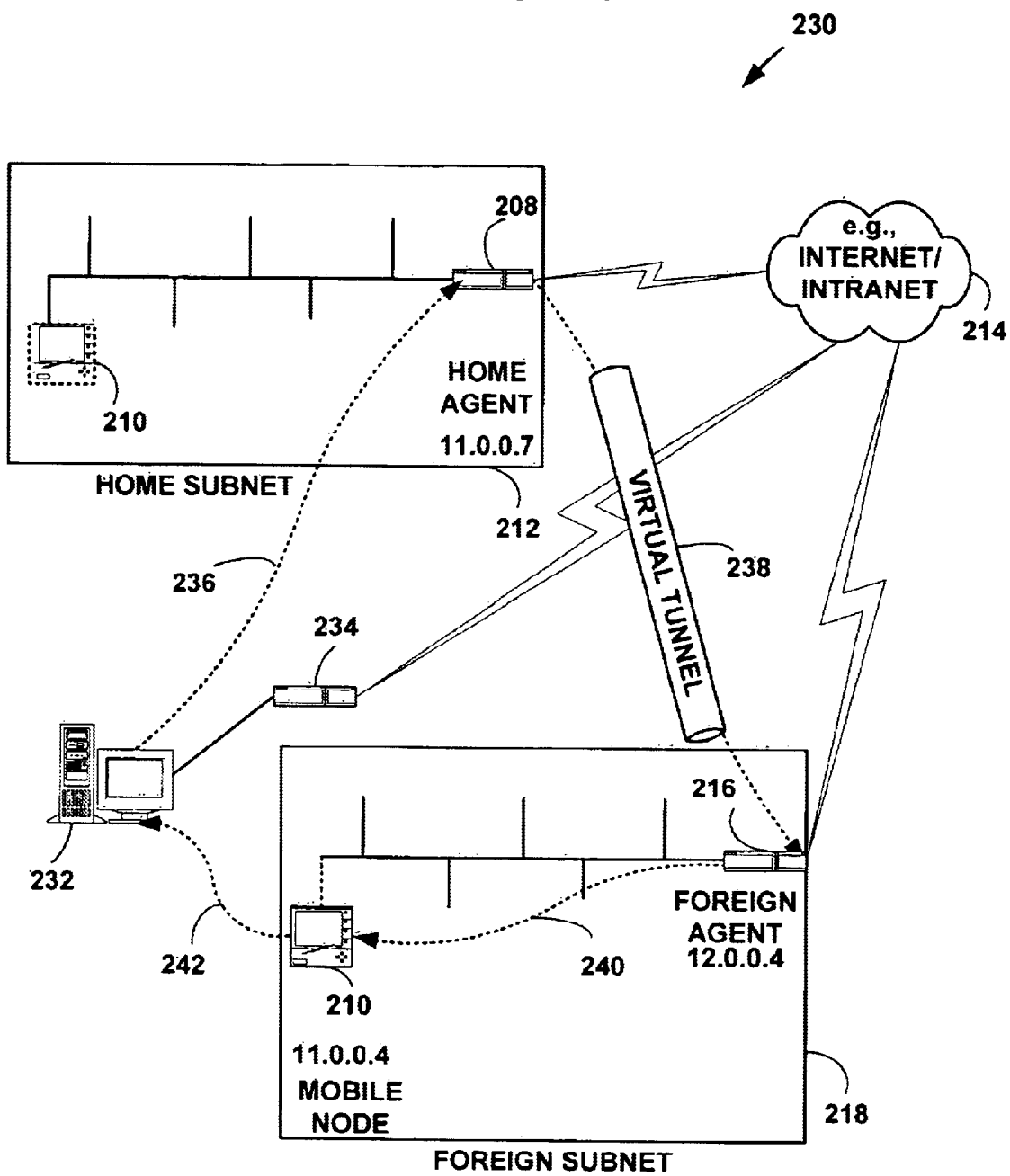
FIG. 16 is a block diagram illustrating Mobile Internet Protocol communications an exemplary Mobile Internet Protocol system.

FIG. 16 is a block diagram illustrating exemplary Mobile IP communications in an exemplary Mobile IP system 230. Round-trip routing to and from the mobile node 210 is typically asymmetric and follows a triangular path. A "virtual" triangular routing path is illustrated in FIG. 16 with dashed lines. However, the actual routing path is accomplished between the home subnet 212 and the foreign subnet 218 using the solid line connections illustrated in FIG. 16 via external network 214.

As is illustrated in FIG. 16, a correspondent 232 with a router 234 receives data packets for the mobile node 210 from the external network 214. The correspondent 232 is, for example, a network access service provider being used by mobile node 210. In FIG. 16, the correspondent 232 sends 236 data packets for the mobile node 210 to the mobile node's home agent 208. Dashed line 236 illustrates a "virtual" data flow pathway between the correspondent 234 and the home agent 208.

Assuming that the mobile node 210 has roamed to the foreign subnet 218 and has registered its current location (e.g., on foreign subnet 218 and on the home subnet 212), the home agent 208 creates a "virtual tunnel" 238 to the foreign agent 216 via external network 214. As is known in the art, a virtual tunnel can be created by encapsulating a data packet inside another data packet by adding additional tunnel packet headers. In one preferred embodiment of the present invention, IP-in-IP tunneling is used. For more information on IP-in-IP tunneling see RFC-1853, incorporated herein by reference. However, other virtual tunnels can also be created (e.g., with UDP 58 tunneling or double IP-in-IP tunneling). When the foreign agent 216 receives tunneled packets, it removes the tunnel packet headers and routes 240 them to the mobile node 210, which is currently registered on the foreign network 218.

When the mobile node 210 sends packets to an external destination on external network 214, no tunneling is used. Data packets are transmitted 242 from mobile node 210 to the correspondent 232. Thus, a "virtual" routing triangle is formed as illustrated by the dashed lines in FIG. 16. The virtual routing triangle is a "logical" route rather than a "physical route." The physical route includes routes through external network 214. The correspondent 232 routes the data packets on to the external destination via the external network 214.

The mobile node 210, the home agent 208, and the foreign agent 216 maintain very little Mobile IP state information. The mobile node 210 periodically transmits "keep-alive" messages using ICMP 50 messages, including standard ICMP 50 messages, and other ICMP 50 messages that are unique to Mobile IP. Mobile node 210 can roam to foreign subnets other than foreign subnet 218 and register with other foreign agents using mobile IP.

DNAT and Mobile IP

Figure 17:
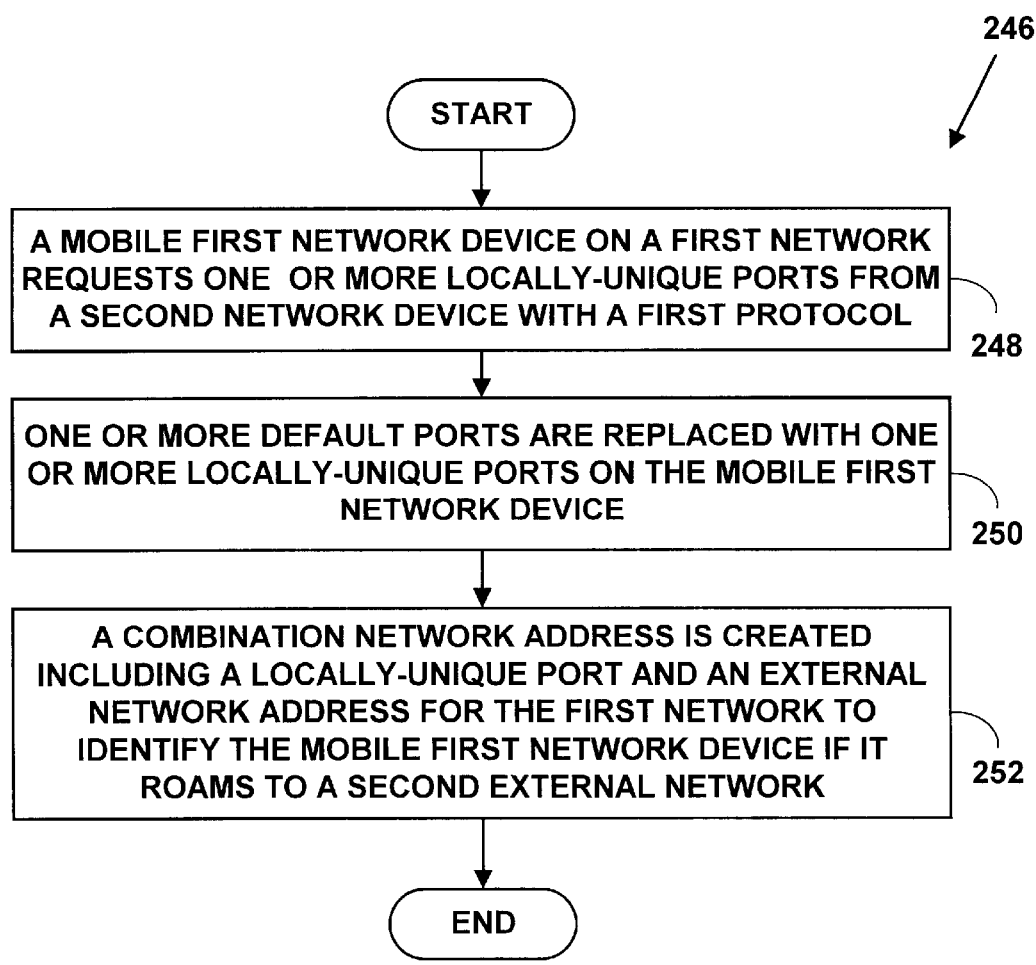
FIG. 17 is a flow diagram illustrating a method for distributed network address translation with Mobile Internet Protocol.

In a preferred embodiment of the present invention, the Distributed Network Address Translation ("DNAT") described above is used with Mobile IP. Mobile network devices such as mobile node 210 use DNAT in conjunction with Mobile IP. FIG. 17 is a flow diagram illustrating a Method 246 for DNAT with Mobile IP.

A mobile first network device on a first network is assigned a local network address on a first network (e.g., a home subnet). The assignment could be static or dynamic (e.g., with the Dynamic Host Configuration Protocol). The local network address is used to identify the first network device on the first network during communications with a second external network (e.g., a foreign subnet). The local network address is not globally routable. That is, the local network address can not be directly used to receive data from the second external network. The local network address allows full duplex (i.e., send and receive) on the first network and half-duplex communications (i.e., send only) with the second external network.

At Step 248, the mobile first network device on the first network requests with a first protocol (e.g., PAP 64), one or more locally-unique ports from a second network device on a first network to identify the first network device on the first network if the mobile first network device roams to a second external network. In a preferred embodiment of the present invention, the mobile first network node can request new locally-unique ports at any time with the first protocol (e.g., with the PAP 64). The second network device can also de-allocate the locally-unique ports assigned to the mobile first network device at any time with the first protocol (e.g., with the PAP 64).

At Step 250, one or more default or ephemeral ports on the mobile first network device are replaced with one or more locally-unique ports (e.g., default or ephemeral TCP 58 ports replaced with locally-unique ports for distributed network address translation). A default port is typically statically assigned. An ephemeral port is typically dynamically assigned for a duration of time. The one or more locally-unique ports allow the mobile first network device to use distributed network address translation. At step 252, a combination network address is created for the mobile first network device with a locally unique port from the one or more requested locally unique ports and an external network address for the first network to identify the mobile first network device if the mobile first network device roams to a second external network. The mobile first network device periodically transmits "keep-alive" messages to second network device, indicating that the mobile first network device is still located on the first network.

In one exemplary preferred embodiment of the present invention, Method 246 is used with Mobile IP. However, the present invention is not limited to use with Mobile IP and could be used with other mobile networking protocols. In one preferred embodiment of the present invention, the locally-unique ports can be requested at Step 248 (FIG. 17) with a PAP 64 request message 66 (FIG. 3) message in a Mobile IP ICMP 50 message. In another embodiment of the present invention, the locally-unique ports and a combination network address can also be requested at step 258 (FIG. 18) with a PAP 64 request message 66 in a Mobile IP ICMP 50 message when the mobile first node registers its presence on the second network.

The mobile node 210 (FIG. 16) is assigned a local network address on the home subnet 212 (e.g., IP 48 address 11.0.0.4). This local network address is not globally routable. The local network address is assigned before the mobile node 210 is allowed to roam off the first network. At Step 248, the mobile node 210 requests one or more locally-unique ports with the Port Allocation Protocol 64 (FIG. 3) from the home agent 208. As was discussed above, the home agent 208 functions as a gateway router. The locally-unique ports are used to perform DNAT on the mobile node 210 and are used to help uniquely identify the mobile node 210 on the home subnet 212 and when the mobile node 210 roams away from the home subnet 212. At Step 250, the mobile node 210 replaces one or more default or ephemeral ports, such as TCP 58 ports, with one or more locally-unique ports. At Step 252, a combination network address is created for the mobile node 210 with a locally unique port and an external network address for the home subnet 212 to identify the mobile node 210 for communications with the foreign subnet 218. The combination network address includes a common external IP 48 address identifying network devices on the home subnet 212 to the external computer network 214 and a locally-unique-port allocated with the Port Allocation Protocol 64.

The mobile node 210 periodically transmits a keep-alive message to the home agent 208, indicating that the mobile node 210 is still located on the home network 212. In one preferred embodiment of the present invention, the keep-alive message is a standard ICMP 50 message. In another embodiment of the present invention, the ICMP 50 message is a Mobile IP ICMP 50 message. However, other protocol messages could also be used.

Figure 18:
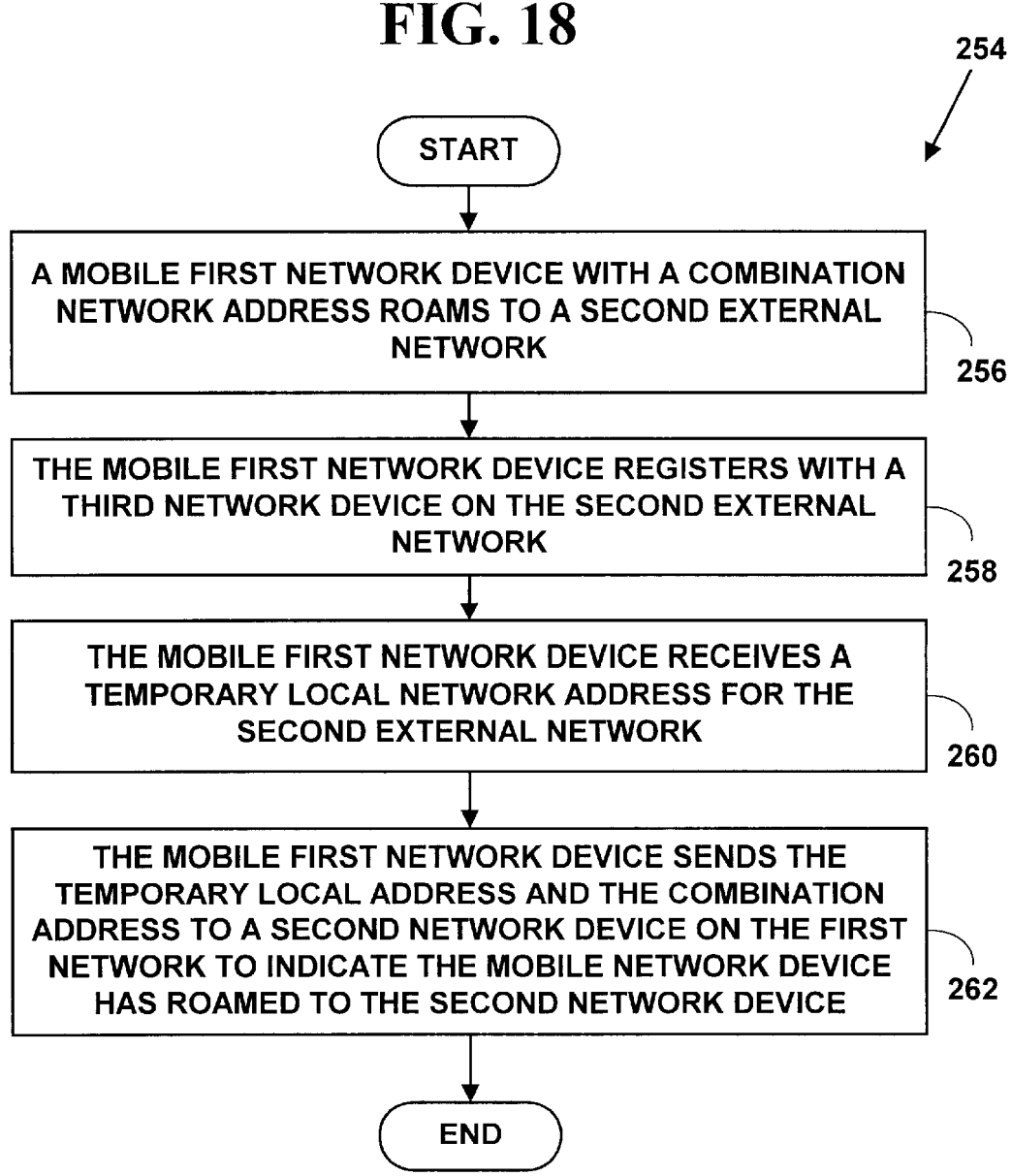
FIG. 18 is a flow diagram illustrating a method for distributed network address translation with Mobile Internet Protocol.

FIG. 18 is a flow diagram illustrating a Method 254 for DNAT with Mobile IP. At Step 256, a mobile first network device roams from a first network to a second external network. The mobile first network device is identified on the first network by a combination network address including a locally-unique port and an external network address for the first network. The locally-unique port allows DNAT to be used with Mobile IP. At Step 258, the mobile first network device registers with a third network device on the second external network. In one preferred embodiment of the present invention, the mobile first network device registers its combination network address with the third network device and completes a Mobile IP registration at step 258. At step 260, the mobile first network device receives a "temporary foreign network address" from the third network device to identify the mobile first network device on the second external network.

At step 262, the mobile first network device sends the temporary foreign network address and the combination network address to a second network device on the first network to indicate that the mobile first network device has roamed to the second external network. The combination network address and the temporary foreign network address are used to send data packets received on the first network to the mobile first network device that has roamed to the second external network.

In one exemplary preferred embodiment of the present invention, Method 246 is used with Mobile IP. However, the present invention is not limited to use with Mobile IP and could be used with other mobile networking protocols.

In one preferred embodiment of the present invention, when the mobile first network device communicates with a network device on the second external network, the mobile first network device uses the external network address from the combination network address. The locally unique port number may or may not be used. However, the mobile first network device also responds to requests addressed to the temporary foreign network address assigned to the mobile first network device by the third network device on the second external network. When the mobile first network device communicates with network devices outside of the second external network to which it has roamed, the mobile first network device uses both the external network address and the locally-unique port from the combination network address to identify the mobile first network device.

In one preferred embodiment of the present invention, at Step 256 the mobile node 210 roams from the home subnet 212 to the foreign subnet 218. At Step 258, the mobile node 210 registers with the foreign agent 216 on the foreign subnet 218. In one preferred embodiment of the present invention, the registration includes registering the mobile nodes 210 combination network address with the foreign agent 216 and completing a Mobile IP registration on the foreign agent 216. At step 260, the mobile node 210 receives a temporary foreign local network address the foreign agent 216 to identify the mobile node 210 on the foreign network 218.

At step 262, the mobile node 210 sends the temporary foreign local network address and the combination network address to the home agent 208 on the home subnet 212 to indicate that the mobile node 210 has roamed to the foreign subnet 218. The combination network address and the second local network address are used to send data packets received on the home subnet 212 to the mobile node 210 on the foreign subnet 218.

Figure 19:
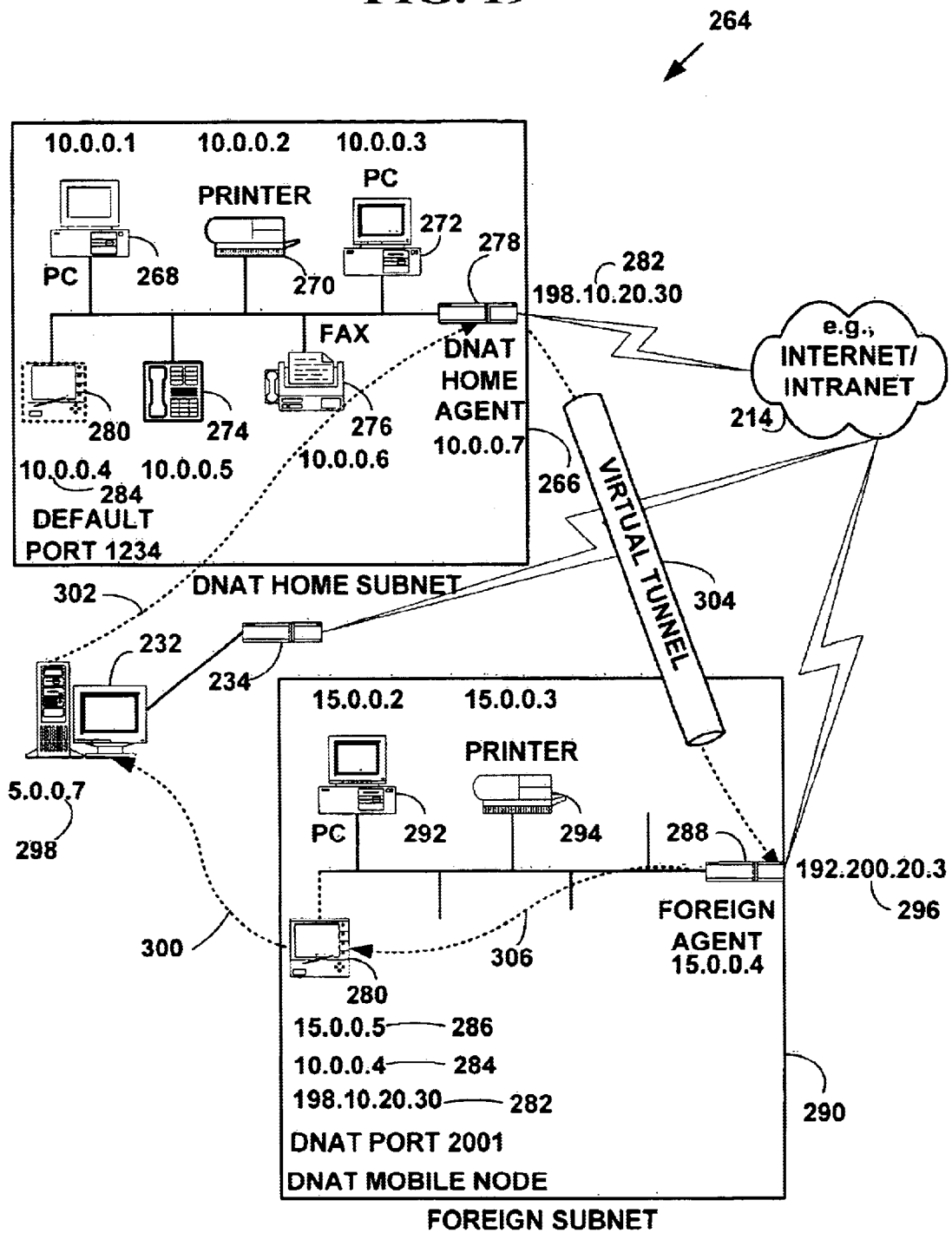
FIG. 19 is a block diagram illustrating an exemplary Mobile Internet Protocol system using distributed network address translation.

FIG. 19 is a block diagram illustrating an exemplary Mobile IP system 264 using DNAT. A DNAT home subnet 266 includes immobile network devices 268, 270, 272, 274, 276 and 278. However, more or fewer immobile network devices can also be used. Immobile node 278 is a DNAT home agent 278 for the DNAT home subnet 266. The DNAT home agent 278 is a DNAT router as was described above. The DNAT home subnet 266 also includes a DNAT mobile node 280. However, more mobile network devices can also be used. The DNAT mobile node 280 uses an external network address 282 (e.g., an IP 48 address of 198.10.20.30) for communications outside the DNAT home subnet 266. While communicating on the DNAT home subnet 266, the DNAT mobile node 280 uses a local non-routable network address 284 (e.g., an IP 48 address of 10.0.0.4) for communications on the DNAT home subnet 266. The DNAT home agent 278 uses the local non-globally routable network address 284 to identify the DNAT mobile node 280 on the DNAT home subnet 266. When the DNAT mobile node 280 roams, it continues to recognize the local non-globally routable local network address 284 from the DNAT home subnet 266 as a network address for which the DNAT mobile mode 280 can possibly receive data packets. However, the local non-globally routable network address 284 is used by the DNAT home agent 278 to send data packets to the DNAT mobile node 280 when it is on the DNAT home subnet 266.

The roaming DNAT mobile node 280 is also assigned a temporary foreign local network address 286 (e.g., an IP address of 15.0.0.5) by a foreign agent 288 on a foreign subnet 290. The foreign subnet 290 is illustrated with two immobile network devices 292 and 294. However, more or fewer immobile network devices could also be used. The roaming DNAT mobile node 280 uses the temporary foreign local network address 286 to communicate with other nodes on the foreign subnet 290. The foreign agent 288 also uses the temporary foreign local network 286 address to identify the roaming DNAT mobile node 280 on the foreign subnet 290. The DNAT mobile node 280 supports multiple network addresses (e.g., 282, 284, 286) and determines which network address to use in a given situation. The foreign agent 288 may also support DNAT for its own mobile network devices. However, in a preferred embodiment of the present invention, the foreign agent 288 is not required to support DNAT.

The DNAT mobile node 280 uses an external network address 282 (e.g., an external IP address of 198.10.20.30) to communicate with the external network 214 since the local home network address 284 on the DNAT home subnet 266 and the temporary foreign network address 286 on the foreign subnet 290 are not globally routable. The DNAT mobile node 280 was assigned the local home network address 284 of 10.0.0.4 on the DNAT home subnet 266 by the DNAT home agent 278. The DNAT mobile node 280 is currently registered on the foreign subnet 290 that has a foreign network access address of 15.0.0.Z/24. The foreign agent 288 has an external network address 296 (e.g., an IP address of 192.200.20.3) to communicate with the external network 214.

FIG. 19 also illustrates a correspondent 232 with a router 234. The DNAT mobile node 280 is connected to the correspondent 232 to provide access to the external network 214. The correspondent has a network address 298 (e.g., an IP 48 address of 5.0.0.7). The correspondent 232 uses a TCP 58 port of 80. The DNAT mobile node 280 may communicate with the correspondent over a wireless connection or a wireline connection.

As an example, the DNAT mobile node 280 has a local non-routable network address 284 of 10.0.0.4 (e.g., IP 48 address) and default or ephemeral port of 1234 (e.g., TCP 58 port) on the DNAT home subnet 266. The DNAT mobile node 280 desires to roam to a foreign subnet. In one preferred embodiment of the present invention the DNAT mobile node 280 applies Method 246 of FIG. 17. The DNAT mobile node 280 is assigned a locally-unique port of 2001 with the PAP 64 and replaces a default or ephemeral port of 1234 to allow DNAT to be used. The default or ephemeral ports may also be replaced on-the-fly with DNAT with port translation in the link layer 44 discussed above when data packets are sent or received on the DNAT mobile node 280. The DNAT mobile node 280 is assigned a combination address including the external address of the DNAT home subnet 282 of 198.10.20.30 and the locally-unique port of 2001 from the PAP 64 to uniquely identify the DNAT mobile node 280 for the DNAT home agent 278. In one preferred embodiment of the present invention the DNAT mobile node 280 roams to the foreign subnet 290 and applies Method 254 of FIG. 18. Locally-unique ports and a combination network address can also be obtained with the PAP 64 at Step 258 of Method 254. The DNAT mobile node 280 receives a temporary foreign network address 286 of 15.0.0.5 on the foreign subnet 290 to identify the DNAT mobile node 280 on the foreign subnet 290.

DNAT mobile node 280 sends a data packet to correspondent 232 for the DNAT home agent 278. In this example, the data packet requires a reply to the DNAT mobile node 280. Table 13 illustrates an exemplary data packet layout for a virtual data path 300 (FIG. 19) from the DNAT mobile node 280 to the correspondent 232 using Mobile IP. The virtual data path 300 is illustrated by a dashed line in FIG. 19.

TABLE 13

| IP 48 header | TCP 58 header |
|---|---|
| SRC IP 198.10.20.30 | SRC Port 2001 |
| DST IP 5.0.0.7 | DST Port 80 |

The DNAT mobile node 280 sends out data packets (e.g., TCP/IP data packets) with a source IP 48 address of 198.10.20.30 that is the external address 282 of DNAT home subnet 266 and a locally-unique port of 2001 from a combination network address assigned by Method 246 of FIG. 17. The combination address uniquely identifies the DNAT mobile node 280 on the DNAT home subnet 266. The DNAT mobile node 280 uses the network address 298 of the correspondent 232 of 5.0.0.7 (e.g., IP 48 address) as the destination network address and the port of 80 (e.g., TCP 58 port) for the destination port in the data packet illustrated in Table 13.

Table 14 illustrates an exemplary data packet layout for a virtual data path 302 from the correspondent 232 to the DNAT home agent 278.

TABLE 14

| IP 48 header | TCP 58 header |
|---|---|
| SRC IP 5.0.0.7 | SRC Port 80 |
| DST IP 198.10.20.30 | DST Port 2001 |

The correspondent 232 reverses the source and destination network addresses as well as the source and destination ports for the data packet it received from the DNAT mobile node 280. The destination IP 48 address of 198.10.20.30 is the external network address 282 of the home subnet 266. The DNAT destination port of 2001 helps to uniquely identify the DNAT mobile node 280. When the DNAT home agent 278 receives the data packet, it uses the DNAT destination port of 2001, which is a locally-unique port assigned to the DNAT mobile node 280, to uniquely identify the data packet as being for the DNAT mobile node 280. If the DNAT mobile node 280 is located on the DNAT home subnet 266, then the DNAT home agent 278 sends a reply to the DNAT mobile node 280 using DNAT as discussed above. The DNAT mobile node 280 uses DNAT to route the reply to the appropriate layer in the protocol stack 42. The reply may also be sent to the DNAT mobile node 280 using DNAT with port translation in the link layer 44 in the DNAT mobile node 280 discussed above.

However, if the DNAT mobile node 280 has roamed from the DNAT home subnet 266 to the foreign subnet 290, the DNAT home agent 278 has to send a reply to the data packet to the DNAT mobile node 280 on the foreign subnet 290.

Table 15 illustrates an exemplary data packet layout for virtual data path 304 from the DNAT home agent 278 to the foreign agent 288 using a virtual tunnel with single IP-in-IP tunneling. However, double IP-in-IP tunneling can also be used.

Using single IP-in-IP tunneling, a first end of the tunnel on the DNAT home agent has a tunnel IP 48 address of 198.10.20.30, which is the external address 282 of the DNAT home subnet 266. However, other tunnel addresses could also be used. A second end of the tunnel on the DNAT home agent has a tunnel IP 48 address of 192.200.20.3, which is the external address 296 of the foreign subnet 290. However, other tunnel addresses could also be used. Table 15 illustrates the tunnel headers.

TABLE 15

| Outer IP 48 header | Inner IP 48 header | TCP 58 header |
|---|---|---|
| SRC IP 198.10.20.30 | SRC IP 5.0.0.7 | SRC Port 80 |
| DST IP 192.200.20.3 | DST IP 198.10.20.30 | DST Port 2001 |

With the DNAT single IP-in-IP tunneling, the DNAT home agent 278 at local non-routable 266 of address 10.0.0.7 and port 80 at the first end of the virtual tunnel with the external network address 282 of 198.10.20.30 is sending a reply data packet for correspondent 232 at IP 48 address 298 of 5.0.0.7 to the DNAT mobile node 280 at the second end of the virtual tunnel at the external network address 192.200.20.3 via the foreign subnet 290. The DNAT mobile node 280 is identified by the combination network address with a destination network address of 198.10.20.30 and a destination port of 2001.

In another preferred embodiment of the present invention, the virtual tunnel illustrated in Table 15 can also be a double IP-in-IP virtual tunnel. If a double IP-in-IP tunnel is used, the DNAT home agent 278 uses a virtual tunnel with a total of three IP 48 headers to transmit a data packet to the DNAT mobile node 280. The innermost IP 48 header is a header received from the correspondent 232. The middle IP 48 header includes a source address of the foreign agent's internal network address (e.g., 15.0.0.4). The middle IP 48 header includes a destination address of the temporary foreign network address 286 (e.g., 15.0.0.5) assigned to the DNAT mobile node 280 by the foreign agent 288 on the foreign subnet 290. The outermost IP 48 header includes the DNAT home subnet external network address 282 of 198.10.20.30 as a source address. The destination address is the foreign subnet's external network address 296 of 192.200.20.3.

Double IP-in-IP tunneling assumes the DNAT home agent 278 has the internal network address of the foreign agent 288 on the foreign subnet 290 and the temporary foreign network address 286 the foreign agent 288 has assigned to the DNAT mobile node 280. These addresses can be obtained, for example, at Step 258 and Step 262 (FIG. 18) when the DNAT mobile node 280 registers with the DNAT home agent 278 and the foreign agent 288. Table 16 illustrates exemplary double IP-in-IP tunneling.

TABLE 16

| Outermost IP 48 header | Middle IP 48 header | Innermost IP 48 header | TCP 58 header |
|---|---|---|---|
| SRC IP 198.10.20.30 | SRC IP 15.0.0.4 | SRC IP 5.0.0.7 | SRC Port 80 |
| DST IP 192.200.20.3 | DST IP 15.0.0.5 | DST IP 198.10.20.30 | DST Port 2001 |

The advantage of double IP-in-IP tunneling over single IP-in-IP tunneling is that the foreign agent 288 does not require knowledge of the PAP 64 locally-unique ports the DNAT mobile node 280 is using. However, the extra IP 48 header may increase the amount of bandwidth required to use double IP-in-IP tunneling.

Table 17 illustrates an exemplary data packet layout for virtual data path 306 from the foreign agent 288 back to the DNAT mobile node 280.

TABLE 17

| IP 48 header | TCP 58 header |
|---|---|
| SRC IP 15.0.0.4 | SRC Port 80 |
| DST IP 15.0.0.5 | DST Port 2001 |

Since the DNAT mobile node 280 is on the foreign subnet 290, the foreign agent 288 with a local non-globally routable network address of 15.0.0.4 routes data packets to the DNAT mobile node 280 at its temporary foreign address 286 of 15.0.0.5 as is indicated by the outer IP 48 header in Table 16. DNAT The port may or may not be used.

If there is more than one DNAT mobile node from the DNAT home subnet 266 on the foreign subnet 290, the foreign agent 288 will not have a unique address including an IP address and TCP 58 port to transmit data to. Thus, in one preferred embodiment of the present invention, when a DNAT mobile agent registers with a foreign agent (e.g., at Step 258, FIG. 18) the foreign agent also records the combination network address for the DNAT mobile node. The locally-unique port from the combination network address is used by the foreign agent to distinguish between multiple DNAT mobile nodes on a foreign subnet. Thus, locally unique port 2001 in Table 17 would be used to specifically locate the DNAT mobile node 280 if there was more than one DNAT mobile node on the foreign subnet 290. The foreign agent 288 may also provide locally-unique ports for DNAT for immobile network devices on the foreign subnet 290 as described above.

In another preferred embodiment of the present invention, the foreign agent 288 also tunnels packets to the DNAT mobile node 280. The source tunnel address for such a virtual tunnel is foreign agent's internal network address of 15.0.0.4. The destination tunnel address is the DNAT mobile node 280 temporary foreign network address 286 of 15.0.0.5 assigned by the foreign agent 288 on the foreign subnet 290. Table 18 illustrates exemplary foreign agent 288 to DNAT mobile node 280 tunneling.

TABLE 18

| Outer IP 48 header | Inner IP 48 header | TCP 58 header |
|---|---|---|
| SRC IP 15.0.0.4 | SRC IP 5.0.0.7 | SRC Port 80 |
| DST IP 15.0.0.5 | DST IP 198.10.20.30 | DST Port 2001 |

The method and system of a preferred embodiment of the present invention allows mobile network devices using Mobile Internet Protocol to use distributed network address translation. Distributed network address translation allows mobile network devices to share a smaller number of globally-routable network addresses with immobile network devices on the same subnet, thereby using fewer Internet Protocol addresses.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. A method of distributed network address translation, comprising:

requesting from a mobile first network device on a first network with a first protocol, one or more locally-unique ports, from a second network device on the first network, to identify the first network device if the mobile first network device roams to a second external network;

replacing one or more default or ephemeral ports on the mobile first network device with one or more locally-unique ports; and creating a combination network address for the mobile first network device with a locally unique port and an external network address for the first network to identify the mobile first network device if the mobile first network device roams to a second external network, wherein the first protocol is a Port Allocation Protocol comprising, a port allocation protocol request message, a port allocation invalidate message, and a plurality of combination network addresses including a locally unique port and an external network address for the first network, for distributed network address translation.

2. The method of claim 1 further comprising periodically sending a keep-alive message from the mobile first network device to the second network device to indicate that the first network device is still located on the first network.

3. A computer readable medium having stored therein instructions for causing a central processing unit to execute the Method of claim 1.

4. The method of claim 1 wherein the mobile first network device is a Mobile Internet Protocol mobile node and the second network device is a Mobile Internet Protocol home agent.

5. The method of claim 1 wherein the external network address is an Internet Protocol address and the one or more locally-unique ports are Port Allocation Protocol ports.

6. The method of claim 1 wherein the one or more locally unique ports allow distributed network address translation to be used on the first network device.

7. The method of claim 1 wherein the second network device communicates with the mobile first network device using Mobile Internet Protocol.

8. The method of claim 1 wherein the default or ephemeral ports are Transmission Control Protocol ports or User Datagram Protocol ports.

9. The method of claim 1 wherein the first network is a Mobile Internet Protocol home subnet with distributed network address translation and the second external network is a Mobile Internet Protocol foreign subnet.

10. A method of distributed network address translation, comprising:

roaming a mobile first network device from a first network to a second external network, wherein the mobile first network device is identified by a combination network address obtained with a first protocol, the combination network address including a locally-unique port and an external network address for the first network;

registering the mobile first network device with a third network device on the second external network;

receiving a temporary foreign network address for the mobile first network device from the third network device to identify the mobile first network device on the second external network;

sending the temporary foreign network address and the combination network address from the mobile first network device to a second network device on the first network to indicate that the mobile first network device has roamed to the second external network, wherein the combination network address is for distributed network address translation and to identify the mobile first network device, wherein the first protocol is a Port Allocation Protocol comprising, a port allocation protocol request message, port allocation protocol response message, a port allocation invalidate message, and a plurality of combination network addresses including a locally unique port and an external network address for the first network, for distributed network address translation.

11. A computer readable medium having stored therein instructions for causing a central processing unit to execute the method of claim 10.

12. The method of claim 10 wherein the mobile first network device is a Mobile Internet Protocol mobile node using distributed network address translation, the second network device is a Mobile Internet Protocol home agent using distributed network address translation, and the third network device is a Mobile Internet Protocol foreign agent.

13. The method of claim 10 wherein the first network is a Mobile Internet Protocol home subnet using distributed network address translation and the second external network is a Mobile Internet Protocol foreign subnet.

14. The method of claim 10 wherein the step of registering the mobile first network device includes registering the mobile first network device using Mobile Internet Protocol registration messages.

15. The method of claim 10 wherein the step of registering the mobile first network device includes registering the combination network address for the Mobile first network device with the third network device.

16. The method of claim 10 wherein the sending step includes sending network address from the mobile first network device to a second network device on the First network with Mobile Internet Protocol messages.

17. A method of distributed network address translation, comprising:

receiving data for a mobile first network device on a second network device on a first network; and determining whether the mobile first network device currently resides on the first network, and if not, forwarding the data to a third network device on a second external network using a combination network address from a first protocol to identify the mobile first network device on the second network, wherein the combination network address includes a locally-unique port on the first network and an external network address for the first network to identify the mobile first network device to the second external network, wherein the port allocation protocol request message is a Port Allocation Protocol comprising a port allocation protocol request message, a port allocation response message, a port allocation invalidate message, and a plurality of combination network addresses including a locally-unique port and an external network address for the first network, for distributed network address translation.

18. A computer readable medium having stored therein instructions for causing a central processing unit to execute the method of claim 17.

19. The method of claim 17 wherein the step of forwarding the data to a third network device includes forwarding the data to a third network device on a second network with a virtual tunnel.

20. The method of claim 17 wherein the external network address is an Internet Protocol address and the locally-unique port is a Port Allocation Protocol port.

21. The method of claim 17 wherein the locally unique port allows distributed network address translation to be used on the mobile first network device.

22. The method of claim 17 further comprising:

determining whether the mobile first network device currently resides on the first network, and if so, forwarding the data to the mobile first network device at a local network address on the first network using distributed network address translation.

23. The method of claim 10 further comprising:

determining from the third network device, a temporary local address on the second network assigned to the mobile first network device, using the combination network address to identify the mobile first network device;

forwarding the data from the third network device on the second network to the mobile first network device using the temporary local address assigned to the mobile first network device on the second network.

24. The method of claim 10 wherein the forwarding step includes forwarding the data in a virtual tunnel.

25. The method of claim 10 wherein the mobile first network device is a mobile node, the second network device is a home agent, and the third network device is a foreign agent, used with the Mobile Internet Protocol.

* * * * *